(12) United States Patent
Fujiwara

(10) Patent No.: US 9,965,235 B2
(45) Date of Patent: May 8, 2018

(54) MULTI-FUNCTION PERIPHERAL AND NON-TRANSITORY COMPUTER-READABLE RECORDING MEDIUM STORING COMPUTER-READABLE INSTRUCTIONS CAUSING DEVICE TO EXECUTE WORKFLOW

(71) Applicant: BROTHER KOGYO KABUSHIKI KAISHA, Nagoya, Aichi (JP)

(72) Inventor: Susumu Fujiwara, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days. days.

(21) Appl. No.: 15/381,577

(22) Filed: Dec. 16, 2016

(65) Prior Publication Data

US 2017/0177285 A1    Jun. 22, 2017

(30) Foreign Application Priority Data

Dec. 22, 2015   (JP) ................................. 2015-250518

(51) Int. Cl.
*G06F 3/12* (2006.01)

(52) U.S. Cl.
CPC ............ *G06F 3/1276* (2013.01); *G06F 3/124* (2013.01); *G06F 3/1215* (2013.01); *G06F 3/1294* (2013.01)

(58) Field of Classification Search
None
See application file for complete search history.

(56) References Cited

U.S. PATENT DOCUMENTS

| | | | | |
|---|---|---|---|---|
| 6,707,568 | B1 * | 3/2004 | Yu | G06F 3/1205 358/1.1 |
| 8,526,042 | B2 * | 9/2013 | Watariuchi | G06F 11/1402 358/1.14 |
| 8,810,829 | B2 * | 8/2014 | Liu | G06F 3/1206 358/1.15 |
| 9,021,391 | B2 * | 4/2015 | Kong | H04N 1/00 358/1.15 |
| 2009/0109471 | A1 * | 4/2009 | Yanazume | H04N 1/2166 358/1.15 |
| 2011/0035619 | A1 * | 2/2011 | Watariuchi | G06F 11/1402 714/3 |
| 2015/0002890 | A1 | 1/2015 | Okuno | |

FOREIGN PATENT DOCUMENTS

JP    2015-012518 A    1/2015

* cited by examiner

*Primary Examiner* — Dung D Tran
(74) *Attorney, Agent, or Firm* — Scully, Scott, Murphy & Presser, PC

(57) ABSTRACT

A non-transitory computer-readable recording medium stores computer-readable instructions which are readable by a controller of a device provided with a communication interface and a notification interface. The computer-readable instructions, when executed by the controller, cause the device to perform determining whether pre-operations defined in multiple jobs contained in a workflow have successfully completed. In response to determination that the pre-operations have successfully completed, the device is caused to execute a main-process in which main-operations respectively defined in the multiple jobs contained in the workflow in order. In response to determination that at least one of the pre-operations has abended, the notification interface is caused to notify that the multiple jobs defined in the workflow are inexecutable.

22 Claims, 11 Drawing Sheets

FIG. 3A

| DEVICE ID | MFP-A |
|---|---|

FIG. 3B

| JOB TYPE | CLASS | LOCATION INFORMATION |
|---|---|---|
| INPUT JOB | scan | /program/input/scan.dll |
| | load_from_local | /program/input/load_from_l.dll |
| | download_from_cloud | /program/input/dl_from_c.dll |
| EDIT JOB | edge_enhancement | www.server-C.com/edit/edge.dll |
| | text_extraction | /program/edit/text.dll |
| OUTPUT JOB | print | /program/output/print.dll |
| | save_to_local | www.server-C.com/output/save_to_l.dll |
| | upload_to_cloud | /program/output/ul_to_c.dll |
| | send_by_mail | /program/output/mail.dll |

```
<WORKFLOW1>
<workflow>
<input class="load_from_local" order=1>
     <file>/document/ESTIMATE.doc</file>
</input>

<output class="print" order=2>
     <device>MFP-A</device>
     <size>A4</size>
     <color>mono</color>
</output>
</workflow>
```

FIG. 4A

```
<WORKFLOW2>
<workflow>
<input class="scan" order=1>
     <device>MFP-A</device>
     <color>multi</color>
     <resolution>600</resolution>
</input>

<filter class="edge_enhancement" order=2 />
<filter class="text_extraction" order=3 />

<output class="upload_to_cloud" order=4>
     <device>www.server-B.com</device>
     <file>/share/$DATE.jpeg</file>
     <account ID="userA" PASS="1234" />
</output>
</workflow>
```

FIG. 4B

MULTI-FUNCTION PERIPHERAL AND NON-TRANSITORY COMPUTER-READABLE RECORDING MEDIUM STORING COMPUTER-READABLE INSTRUCTIONS CAUSING DEVICE TO EXECUTE WORKFLOW

CROSS-REFERENCE TO RELATED APPLICATIONS

This application claims priority under 35 U.S.C. § 119 from Japanese Patent Application No. 2015-250518 filed on Dec. 22, 2015. The entire subject matter of the application is incorporated herein by reference.

BACKGROUND

Technical Field

The present disclosures relate to a multi-function peripheral and a non-transitory computer-readable recording medium storing computer-readable instructions, which cause a controller of a device to execute a workflow.

Related Art

Conventionally, a non-transitory computer-readable recording medium storing computer-readable instructions which cause a controller of a device to execute a user-designated workflow including a plurality of operations (e.g., a scanning operation, a printing operation and the like) has been known.

SUMMARY

In a computer which is controlled to execute a workflow as mentioned above, if the scanning operation is started while the printing operation included in a state where a user-designated workflow cannot be executed, the printing operation will be abended after the scanning operation has been completed. That is, in such a case, the user, who designates the respective ones of the plurality of operations, cannot enjoy the advantage as all the operations included in the workflow are not successfully completed. Further, the user wastes a time period during which the user waits for completion of the scanning operation.

In consideration of the above, according to aspects of the disclosures, there is provided a non-transitory recording medium containing computer-readable instructions which cause, when executed by a controller of the computer, the computer to notify the user that a workflow which will be executed by the computer will be terminated abnormally at an earlier stage.

According to aspects of the disclosures, there is provided a non-transitory computer-readable recording medium storing computer-readable instructions which are readable by a controller of a device provided with a communication interface and a notification interface. The computer-readable instructions, when executed by a controller of the device, causing the device to obtain definition data in which a workflow is defined, the workflow containing multiple jobs including an input job and an output job, the input job causing a scanner to execute an reading operation to read an image on an original and generate image data representing the read image, and an output job to output the image data which is obtained in the input job. Further, the computer-readable instructions cause the device to execute a pre-process in which pre-operations respectively defined in the multiple jobs contained in the workflow in order, the pre-operations being operations to examine whether the multiple jobs being executable. Furthermore, the computer-readable instructions, when executed by the controller, further cause the device to perform determining whether the pre-operations defined in all the multiple jobs contained in the workflow have successfully completed, in response to determination that the pre-operations defined in all the multiple jobs contained in the workflow have successfully completed, causing the device to a main process in which main-operations respectively defined in the multiple jobs contained in the workflow in order, wherein the main-operation defined in the input job is an operation to receive the image data generated in the reading operation from the scanner through the communication interface, wherein the main-operation defined in the output job is an operation to output the image data, and in response to determination that at least one of the pre-operations defined in all the multiple jobs has abended, causing the notification interface to notify that the multiple jobs defined in the workflow are inexecutable.

According to aspects of the disclosures, there is also provided a multi-function peripheral, which has a scanner, a printer, a communication interface, a notification interface and a controller. The controller causes the multi-function peripheral to obtain definition data in which a workflow is defined, the workflow containing multiple jobs including an input job and an output job, the input job causing the scanner to execute an reading operation to read an image on an original and generate image data representing the read image and obtaining the image data, and an output job causing the printer to record an image represented by the image data which is obtained in the input job on a sheet. Further, the controller causing the multi-function peripheral to execute a pre-process in which pre-operations respectively defined in the multiple jobs contained in the workflow in order, the pre-operations being operations to examine whether the multiple jobs being executable. Furthermore, the controller further causing the multi-function peripheral to perform determining whether the pre-operations defined in all the multiple jobs contained in the workflow have successfully completed, in response to determination that the pre-operations defined in all the multiple jobs contained in the workflow have successfully completed, causing the multi-function peripheral to a main process in which main-operations respectively defined in the multiple jobs contained in the workflow in order, wherein the main-operation defined in the input job is an operation to receive the image data generated in the reading operation from the scanner through the communication interface, wherein the main-operation defined in the output job is an operation to output the image data, and in response to determination that at least one of the pre-operations defined in all the multiple jobs has abended, causing the notification interface to notify that the multiple jobs defined in the workflow are inexecutable.

BRIEF DESCRIPTION OF THE ACCOMPANYING DRAWINGS

FIG. 1 schematically shows a configuration of a system according to an illustrative embodiment of the disclosures.

FIG. 3A shows an example of data representing a device ID stored in a data storage area, and FIG. 3B shows an example of data representing a program list, according to the illustrative embodiment of the disclosures.

FIG. 4A and FIG. 4B show examples of workflow definition files according to the illustrative embodiment of the disclosures.

Figure 8A:
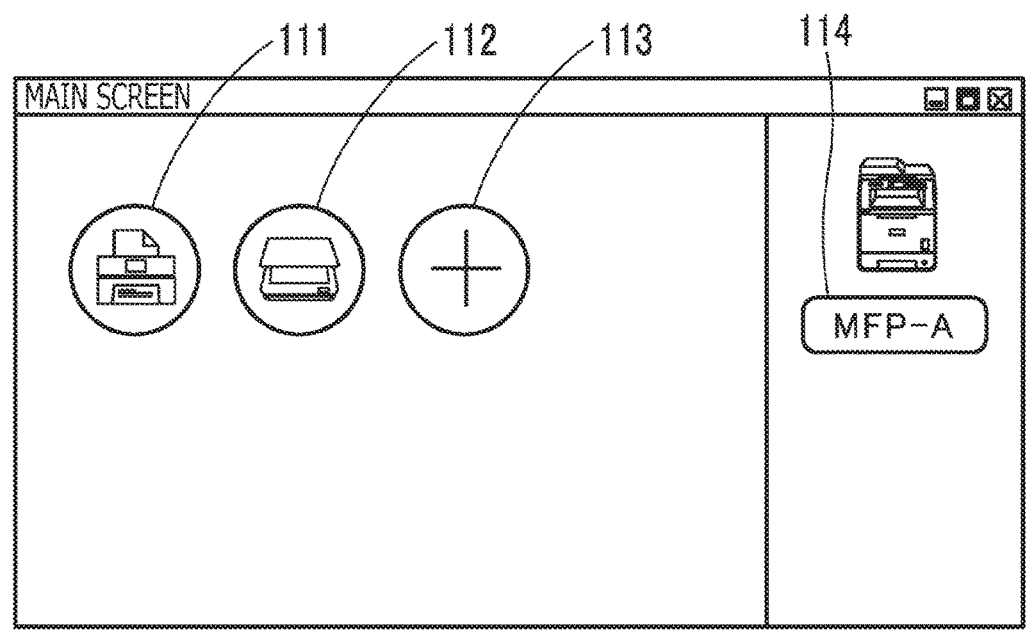
Figure 8B:
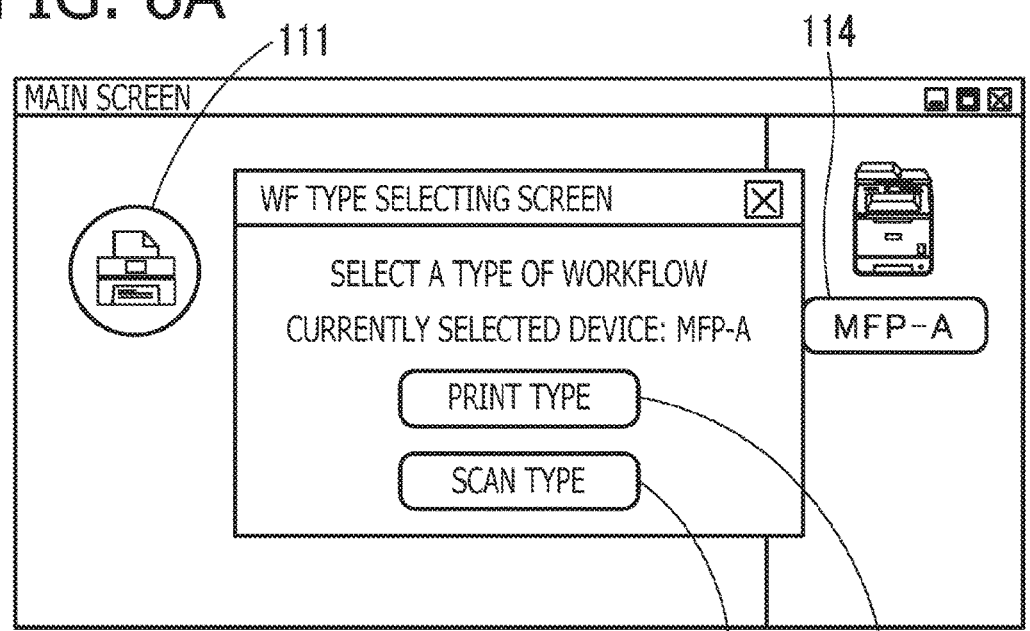

FIG. 8A and FIG. 8B respectively show examples of a main screen and a WF type selecting screen displayed on a display of the information processing terminal according to the illustrative embodiment of the disclosures.

Figure 9A:
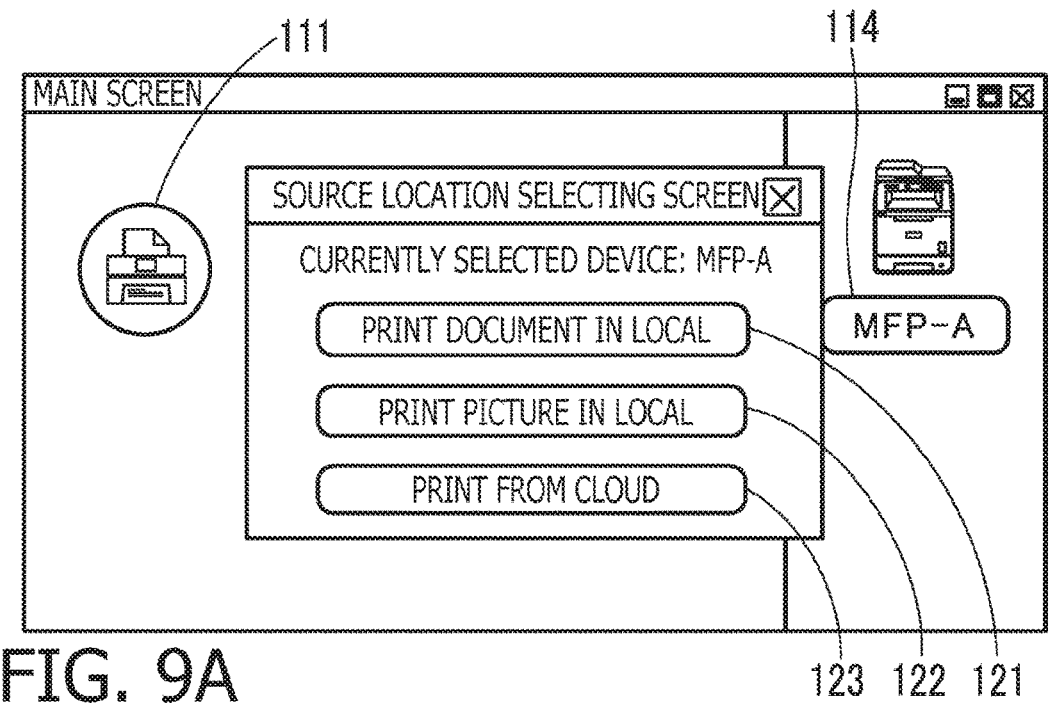
Figure 9B:
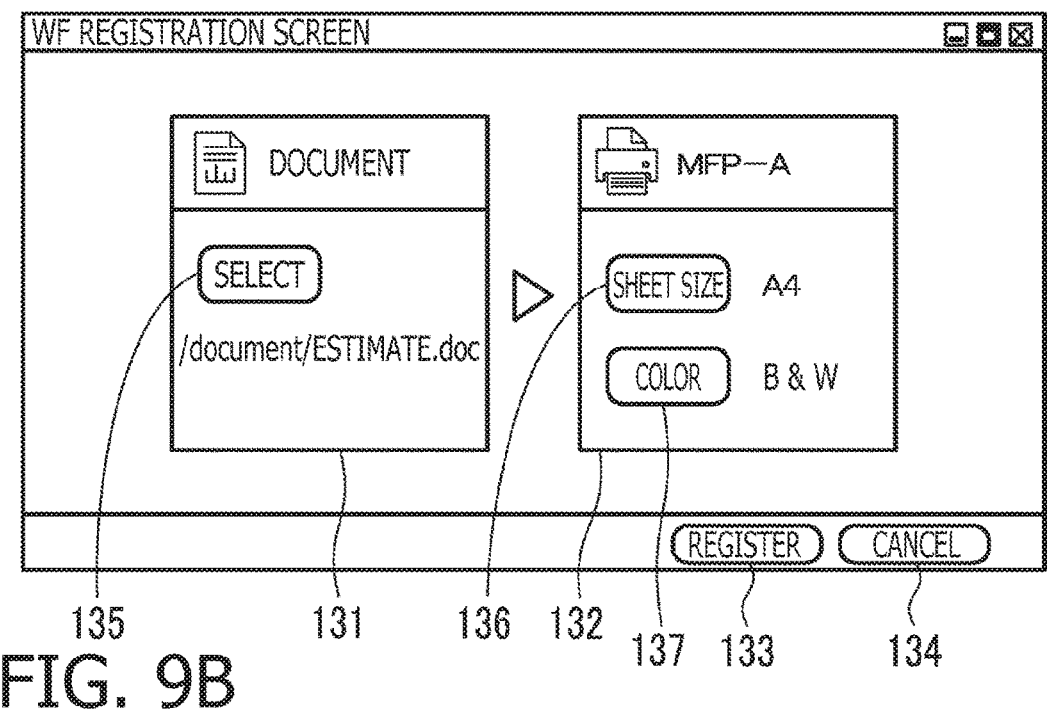

FIG. 9A and FIG. 9B respectively show examples of a source location selecting screen and a WF registration screen when a print type icon is designated displayed on the display of the information processing terminal according to the illustrative embodiment of the disclosures.

Figure 10A:
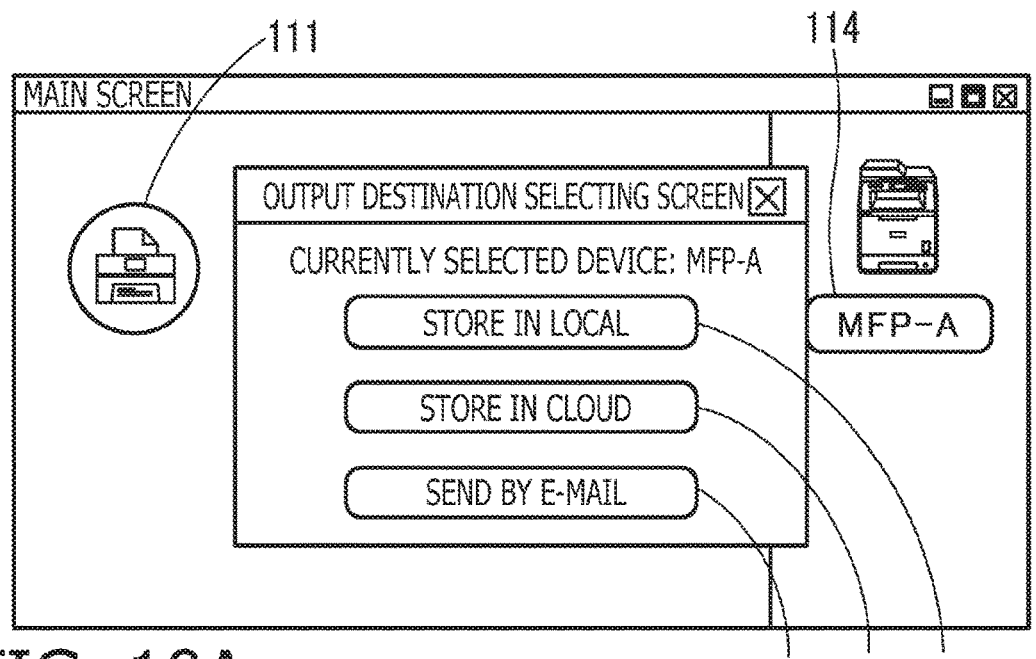
Figure 10B:
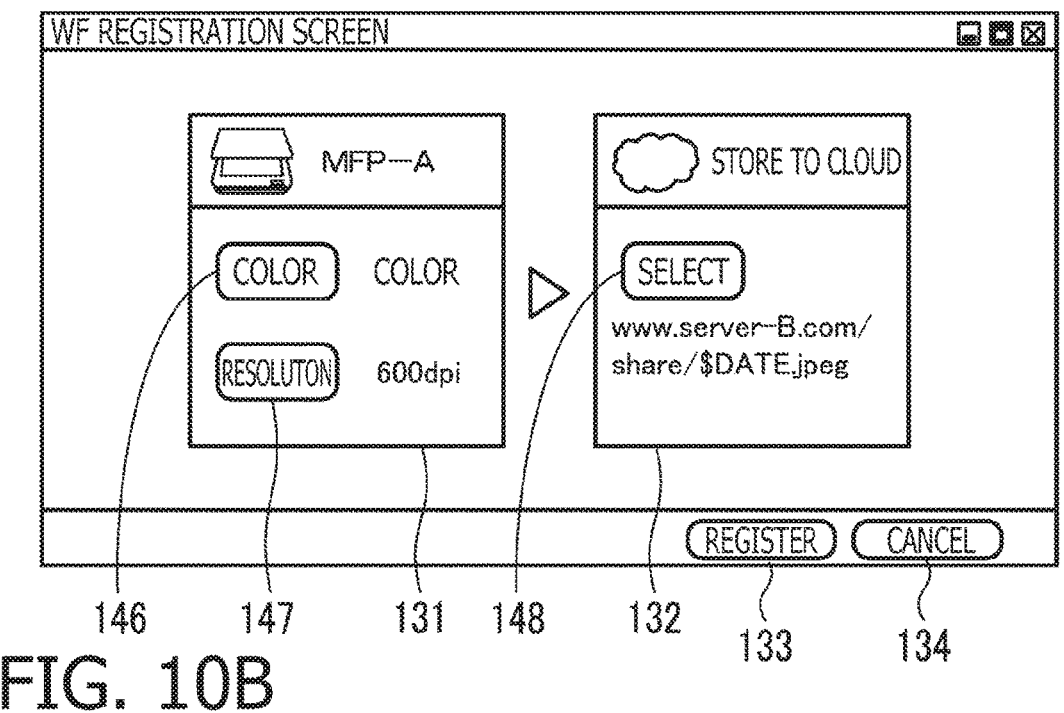

FIG. 10A and FIG. 10B respectively show examples of an output destination selecting screen and a WF registration screen when a scan type icon is designated displayed on the display of the information processing terminal according to the illustrative embodiment of the disclosures.

Figure 11A:
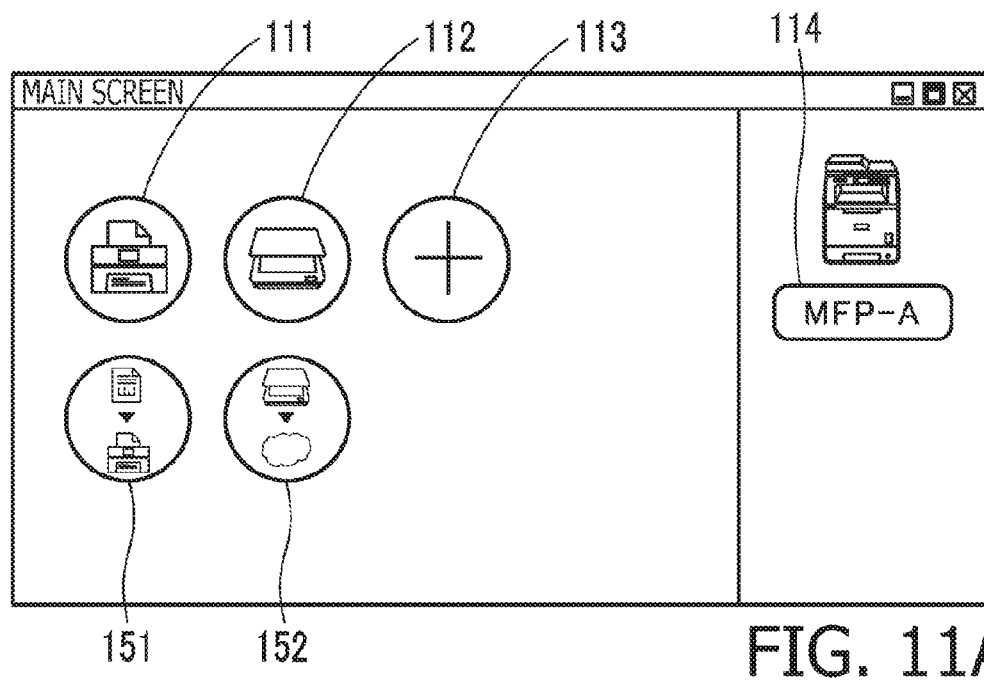
Figure 11B:
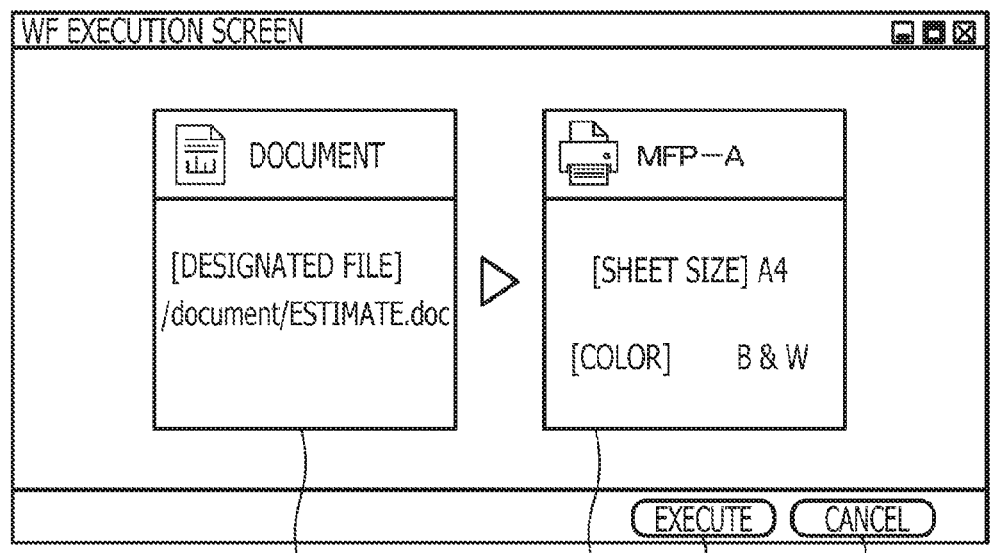

FIG. 11A and FIG. 11B respectively show examples of the main screen in which WF icons have been added and a WF execution screen when the WF icon has been designated displayed on the display of the information processing terminal according to the illustrative embodiment of the disclosures.

DETAILED DESCRIPTION OF THE EMBODIMENT

Hereinafter, referring to the accompanying drawings, an illustrative embodiment according to disclosures will be described. It is noted that an embodiment described below is merely an illustrative example, and can be modified in various ways without departing from the scope of the disclosures. For example, an execution order of processes described below may be changed unless the scope of the disclosures is changed.

Figure 1:
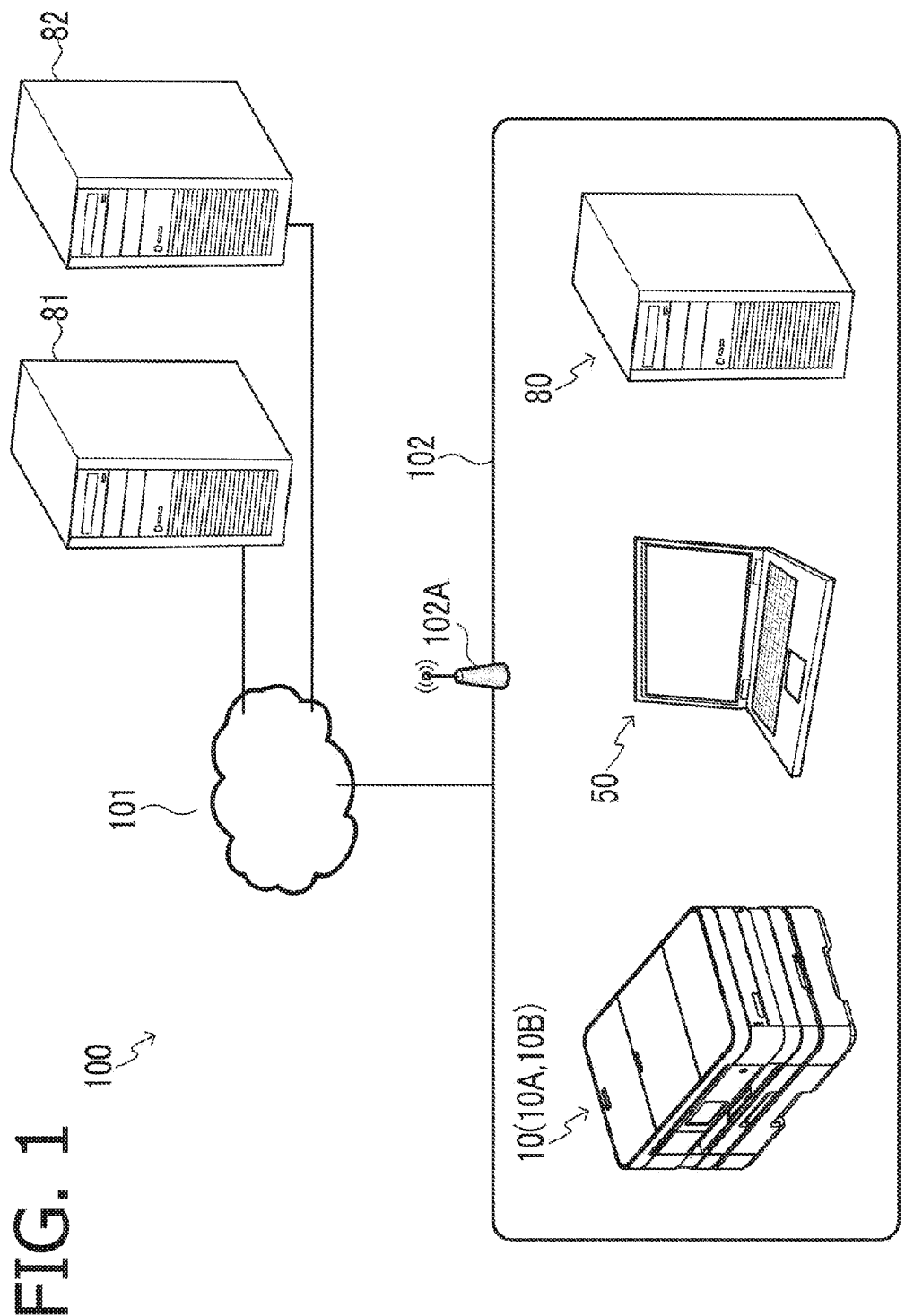

FIG. 1 schematically shows a system 100 according to an illustrative embodiment. The system 100 shown in FIG. 1 includes MFP's 10A and 10B (hereinafter, multiple MFP's will occasionally be referred to as MFP's 10), an information processing terminal 50, servers 80, 81 and 82. It is noted that the server 80-82 may be omitted from the system 100. According to the illustrative embodiment, the MFP's 10, the image processing terminal 50, and servers 80, 81 and 82 are mutually communicable with each other through a communication network. It is noted that any type of communication network may be employed. An example of the communication network may include the Internet 101, a wired LAN, a wireless LAN 102, and a combination of such networks.

The MFP 10, the information processing terminal 50, and the server 80 belong to the wireless LAN 102. That is, the MFP 10, the information processing terminal 50 and the server 80 are capable of communicating with each other through access points (not shown) of the wireless LAN 102. Further, the wireless LAN 102 is connected to the Internet 101 through a router 102A. Further, the servers 81 and 82 are also connected to the Internet 101. That is, the MFP 10 and the information processing terminal 50 are capable of communicating with the servers 81 and/or 82 through the router 102A and the Internet 101.

Figure 2A:
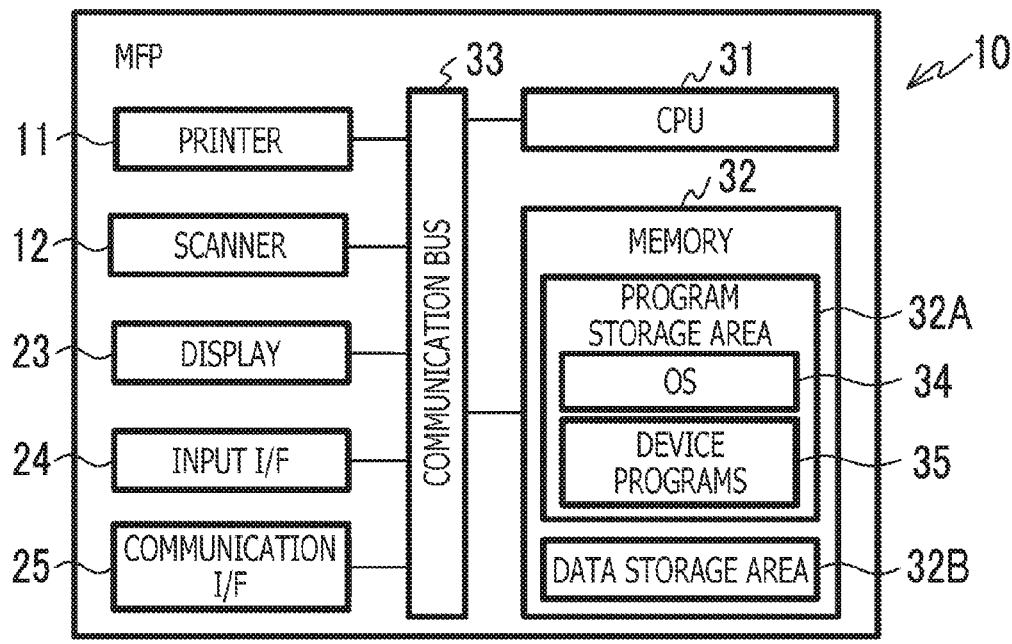
FIG. 2A is a block diagram of an MFP according to the illustrative embodiment of the disclosures.

As shown in FIG. 2A, the MFP 10 has a printer 11, a scanner 12, a display 23, an input I/F 24, a communication I/F 25, a CPU 31, a memory 32 and a communication bus 33, which are configured to be mutually connected with each other through the communication bus 33. It is noted that a configuration of the MFP 10A and that of the MFP 10B may be the same, or may be different. It is noted that the MFP 10 is an example of an image forming apparatus.

The printer 11 is configured to execute a printing operation to record (print) an image represented by image data onto a recording sheet. It is noted that the recording sheet is an example of a sheet or recording medium. As a printing method of the printer 11, a well-known inkjet printing method or an electrophotographic printing method may be employed. The scanner 12 is configured to execute a reading operation to read an image on an original sheet and generate image data representing the read image. Optionally, the MFP 10 may include a facsimile device which is configured to execute a facsimile transmitting/receiving operations to transmit/receive image data in accordance with a facsimile protocol. Further optionally, the system 100 may be provided with a single function printer and/or a single function scanner, which are connected to the wireless LAN 102, instead of or in addition to the MFP 10.

The display 23 has a displaying surface to display various pieces of information. As the display 23, an LCD or an organic EL display may be employed.

An input I/F 24 is an interface through which the MFP 10 receives an input operation by a user. For example, the input I/F 24 has multiple buttons, and configured to output operation signals corresponding to operated buttons to the CPU 31. Optionally or alternatively, the input I/F 24 may have a touch sensor which is overlaid on the displaying surface of the display 23. That is, the display 23 may be configured as a touch panel display. It is noted that an operation to designate objects displayed on the displaying surface of the display 23, an operation to input character strings and/or numeral strings are examples of an input operation.

It is noted that an "object" above means an image which the user can designate by operating the input I/F 24. For example, the object may include a character string, an icon, a button and a link displayed on the display 23. For example, the object may be designated as the user depresses direction keys and/or an enter button of the input I/F 24. When the input I/F 24 is the touch panel, the object displayed on the display 23 may be designated as the user directly touches the object displayed on the display 23 via the touch panel layered thereon.

The input I/F 24 realized by the touch panel is configured to output position information indicating a position on the displaying surface at which the user has touched. It is noted that a term "touch" throughout the specification includes all the operations to cause an inputting medium to contact the displaying surface. That is, a tapping operation to cause the inputting medium which is brought to contact the displaying surface to be removed from the displaying surface within a particular period, a long touching operation, a sliding operation to cause the inputting medium touching the displaying surface to slide on the displaying surface, a flicking operation, a pinch-in operation, a pinch-out operation are examples of the touching operation.

Optionally, a case where the inputting medium is not caused to contact the displaying surface but is caused to be located very close to the displaying surface so that a distance therebetween is very small may be considered to be included in concept expressed by the term "touch." Further, the term "inputting medium" may be a finger of the user, or a touch pen or the like. A user operation to touch a position of the touch panel at a position where an icon is displayed on the display 23 is an example of a designating operation to designate the icon.

The communication I/F 25 is an interface capable of communicate with an external device through the communication network. That is, through the communication I/F 25, the MFP 10 is capable of transmitting various pieces of information to the external device, and receiving various pieces of information from the external device. The communication I/F 25 need not be limited to a specific communication procedure, and a Wi-Fi® system may be employed, for example.

The CPU 31 is configured to control an entire operation of the MFP 10. The CPU 31 receives various pieces of information output by the input I/F 24 and various pieces of information received from the external device through the communication I/F 25, and retrieve various programs (described later) from the memory 32 and execute the same. It is noted that the CPU 31 and the memory 32 constitute an example of a controller.

The memory 32 has a program storage area 32A and a data storage area 32B. The program storage area 32A stores an OS 34 and a device program 35. It is noted that the device program 35 may be a single program, or a program aggregate including a plurality of programs. The data storage area 32B stores data/information necessary to execute the device program.

It should be noted that the "data" and the "information" used in the specification are common in regard to a point that both are bit(s) or a bit string which can be handled by a computer. In the specification, the computer is capable of handling the "data" regardless of the meaning of the bit or bit string. In contrast, the computer handles the "information" such that operations of the computer vary depending on the meaning of respective bit or bit string. Further, an "instruction" represents a control signal causing a destination device, to which the instruction is transmitted, to execute a succeeding operation. The "instruction" may include the "information" or the "instruction" itself may have a property as the information.

It should also be noted that multiple pieces of data or information respectively used in different computers are regarded as the same data or information as far as only difference among the multiple pieces of data/information is a type (e.g., whether the data/information is of a text type, a binary type, a flag type or the like) but the meanings represented by the multiple pieces of data/information are the same. For example information representing there are "two" items may be stored as text type information, "0x32" (ASCII code) on one computer, and in another computer, the same information may be stored as binary format information, "10" (binary notation).

It should further be noted that, although it is described that the "data" and "information" should be distinguished from each other, a distinction therebetween is not always strict, but "data" and/or "information" may be treated as "information" and/or "data." That is, in a particular occasion, "data" may be treated as "information" temporarily, or "information" may be treated as "data" temporarily. Alternatively, one which is treated as "data" in a certain apparatus may be treated as "information" in another apparatus. Further, "information" may be extracted from "data," and/or vice versa.

The memory 32 may include a RAM, a ROM, an EEPROM, an HDD, a portable storage device attachable to and detachable from the MFP 10 (e.g., USB memory), a buffer provided to the CPU 31 and the like, and/or a combination of some of or all of such storages.

It is noted that the memory 32 may be a non-transitory computer-readable storage medium. The non-transitory computer-readable storage medium includes, in addition to ones listed above as storages that may be included in the memory 32, recording mediums such as a CD-ROM, and DVD-ROM. It is noted that the non-transitory medium is also a tangible medium. In contrast, an electrical signal, which carries programs downloaded, for example, from a server on the Internet, is a computer-readable signal medium, which is one type of the computer-readable medium, but not categorized as the non-transitory computer-readable storage medium.

The programs stored in the program storage area 32A are executed by the CPU 31. In the following description, however, execution of the programs may be explained by omitting description of the CPU 31 for brevity. That is, in the following description, a recitation such as "the CPU 31 executes process A defined by program A" will occasionally be recited such that "program A executes process A." Regarding the information processing terminal 50, description will be made in a similar manner.

The programs stored in the program storage area 32A are configured to determine occurred events and operate in accordance with determination. In the following description, however, a recitation of the determination may occasionally be omitted to describe operations of respective programs. For example, a recitation such as "program determines whether condition A is satisfied, and executes process A in response to an affirmative determination" will be used. Such a description will also be used when the information processing terminal 50 is described.

The programs stored in the program storage area 32A are configured to identify, obtain, extract, determine and/or select data and the like. A recitation that "a program identifies data" means, for example, an operation in which a particular data that meets a condition is identified from among a plurality of pieces of data and the particular data of information for identifying the data is stored in a particular storage area. It is noted that the information for identifying the particular data is, for example, identifying information which is referred to when the data is identified, an index of data alignment designating the data, a pointer or the like of the particular storage area in which the data of the is stored. In a case where the program obtains, extracts, determines, or selects the data and the like, information for identifying the data subjected to processing is treated in a similar manner. Further, the data and the information are treated in a similar manner in the information processing terminal 50.

The OS 34 is a basic program which provides an API to control hardware constituting the MFP 10 (e.g., the printer 11, the scanner 12, the display 23, the input I/F 24, the communication I/F 25 and the like). The aforementioned programs control respective components of the hardware by calling the API provide by the OS 34. In the following description, however, a recitation of the OS 34 may be omitted to describe the operations of respective programs. That is, in the following description, a situation that "program B controls hardware C through the API provided by the OS 34" may occasionally be recited such that "program B controls hardware C" for brevity. The similar recitation is made for describing the information processing terminal 50.

Figure 2B:
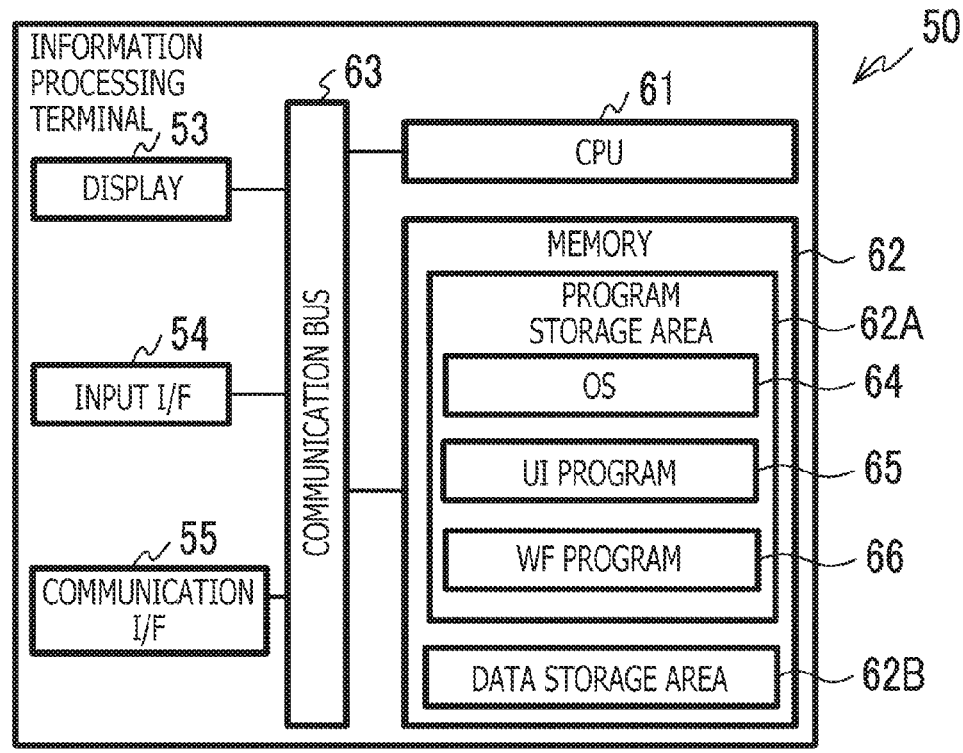
FIG. 2B is a block diagram of an information processing terminal according to the illustrative embodiment of the disclosures.

The image processing terminal 50 has, as shown in FIG. 2B, a display 53, an input I/F 55, a communication I/F 55, a CPU 61, a memory 62 and a communication bus 63. Since the display 53, the input I/F 54, the communication I/F 55, the CPU 61, the memory 62 and the communication bus 63 have the similar configuration as the display 23, the input I/F 24, the communication I/F 25, the CPU 31, the memory 23 and the communication bus 33, respectively, detailed description thereof will be omitted for brevity. It is noted that the CPU 61 and the memory 62 constitute an example of the controller. It is further noted that the information processing terminal 50 may be, for example, a cellphone, a smartphone, a tablet terminal or a PC.

Figure 5:
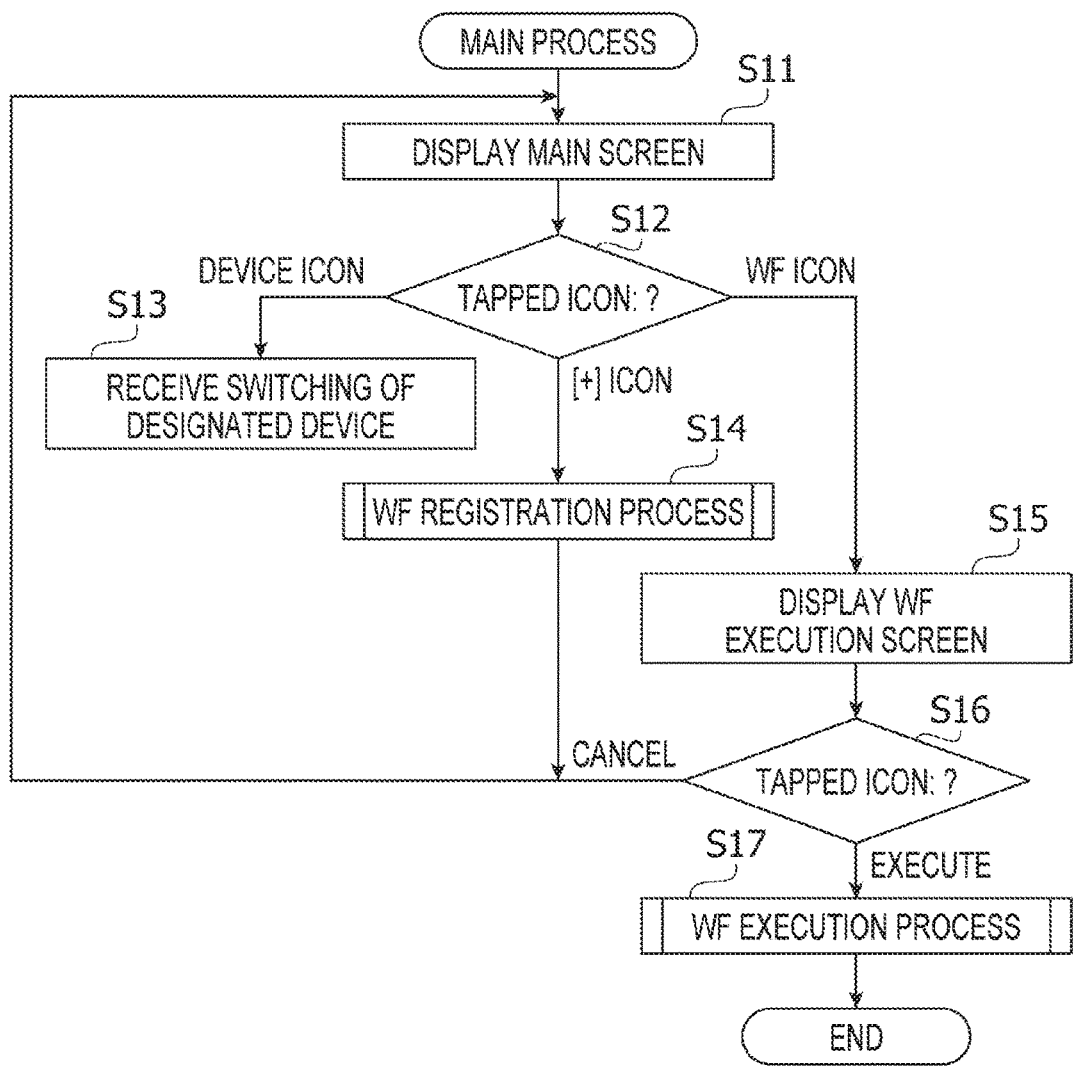
FIG. 5 is a flowchart illustrating a main process executed in the information processing terminal according to the illustrative embodiment of the disclosures.
Figure 6:
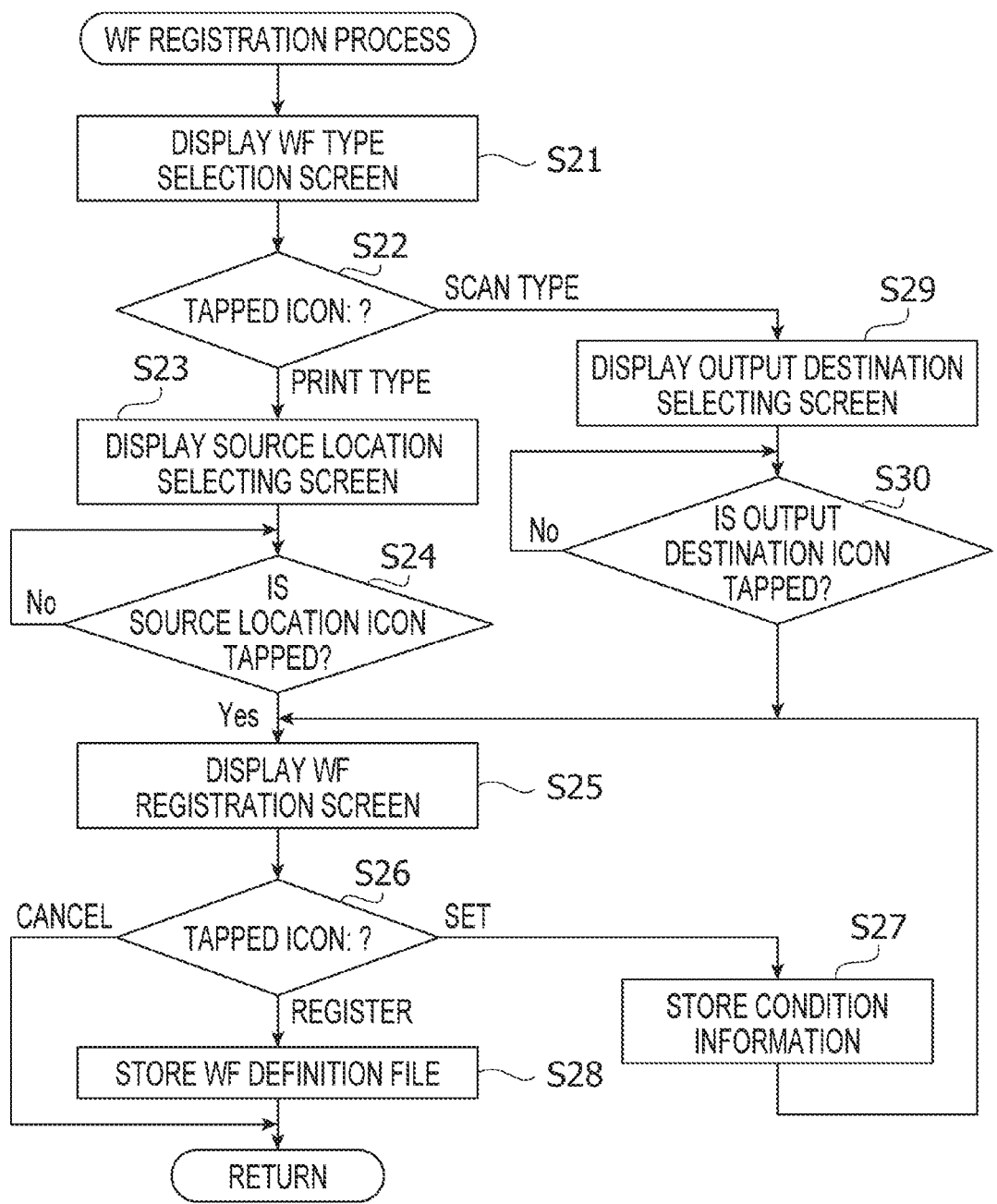
FIG. 6 is a flowchart illustrating a WF (workflow) registration process executed in the information processing terminal according to the illustrative embodiment of the disclosures.

The program storage area 62A of the information processing terminal 50 stores a UI program 65 and a Wi-Fi® program 66. The UI program 65, when executed, a process shown in FIGS. 5 and 6 is executed in which a WF definition table (described later) is stored in the storage area 62B, and transfers the WF definition file designated by the user to the WF program 66. The WF program 66 executes a process shown in FIG. 7 to execute a workflow defined in the WF definition file obtained from the UI program 65. It is noted that the UI program 65 and the WF program 66 may be separate programs, or one integrated program.

The workflow includes multiple jobs. That is, a recitation "the WF program 66 executes a workflow" means that multiple jobs included in the workflow are executed according to a particular order. The multiple jobs are operations with respect image data, respectively. It is noted that the multiple jobs are generally categorized to input jobs, edit jobs and output jobs. The multiple jobs are respectively realized by job programs described later.

The input job is a job causing the WF program 66 to input image data. Examples of the input job include an operation to receive image data, which is generated by a reading operation of the scanner 12, from the MFP 10, a job retrieving image data stored in the data storage area 62B, receiving stored image data from the servers 80 and 81. A workflow includes at least one input job. It is noted that a workflow can include multiple input jobs.

The edit job is a job to edit image data which is acquired in the input job. Specifically, the edit job is a job to modify pixel values included in the image data. Examples of the edit job include a job to enhance edges of image included in the image data, and a job to extract a character string from an image of a character string included in the image data. A workflow may or may not include an edit job. Further, a workflow may include multiple edit jobs.

The output job is a job to output the image data. Specifically, examples of the output job include a job to store the image data in the data storage area 62B, a job to transmit the image data to be stored in the memories of the servers 80 and 81 to the servers 80 and 81, respectively, and a job to transmit e-mail attaching the image data. It is noted that the workflow includes at least one output job. It is further noted that the workflow could include multiple output jobs.

The data storage area 62B of the information processing terminal 50 is configured to store a device ID as shown in FIG. 3A. According to the illustrative embodiment, the device ID is "MFP-A." This device ID (i.e., "MFP-A") is an example of device identification information which is referred to for identifying the MFP 10A which is designated by the user through the input I/F 54 (hereinafter, referred to as a designated device). The device ID is stored in the data storage area 62B by the UI program 65 which is executed in a main process (described later). It is noted that, according to the illustrative embodiment, device ID "MFP-A" is assigned to the MFP 10A, and device ID "MFP-B" is assigned to the MFP 10B.

The data storage area 62B stores, as shown in FIG. 3B, job types, classes and location information for respective classes. In the following description, the entire information shown in FIG. 3B will occasionally be referred to as a "program list," and a set of the job type, a class and a location which are associated with each other will occasionally be referred to as a "program record." According to the above definition, the program list could include a plurality of program records. The program list is stored, for example, in the data storage area 62B when the UI program 65 and/or the WF program 66 is installed. Further, when version up of the UI program 65 and/or the WF program 66 is executed, the program list is updated (e.g., one or more program records may be added).

It is noted that a program record indicates a program (hereinafter, referred to as a job program) executing a job (e.g., the input job, the edit job or the output job). The job type indicates which of the input job, the edit job and the output job is executed by the job program indicated by the program record. A name of the class is an example of an identifier used to identify a job program. The location information is information indicating a location of the job program identified based on the class. The job program may be stored, for example, the program storage area 62A of the information processing terminal 50, or in the server 82 on the Internet 101. The job program is provided, for example, as a module included on a DLL.

For example, a job program which is identified by the class of "scan" (hereinafter, referred to as a job program "scan") is included in a file "scan.dll" which is stored in a folder "/program/input" in the data storage area 62B. It is noted that other job programs are treated in a similar manner Thus, in another example, a job program "edge_enhancement" is included in a file "edg.dll" which is stored in a folder "edit" which is a folder in the server 82 and identified by a URL "www.server-C.com". It should be noted that, although a drawing is not provided, the job programs may be included in the WF program 66.

In each job program, multiple functions are defined. Specifically, a job program includes at least a pre-function that defines a pre-operation and a do-function that defines main-operation. Further, a job program may include a post-function that defines a post-operation. The pre-operation is an operation to check whether a job realized by the job program can be executed. The do-operation is the main-operation realized by the job function. The post-function is an operation to release recourses of the information processing terminal 50 used in the main-operation. It is noted that actual contents of the pre-operation, the main-operation and the post-operation are different among respective job programs.

A job program "scan" executes the input job to receive image data, which is generated by the reading operation, from a designated device. In the pre-function of the job program "scan", operations to determine, for example, whether a communication with the designated device through the communication I/F 55 is available, whether the designated device is executing another reading operation, whether the designated device is configured to execute the reading operation in accordance with an execution condition (described later) defined in the definition data are defined. In the do-function of the job program "scan", for example, an operation to transmit scan instruction information to the designated device through the communication I/F 55, and receive the image data, which is transmitted by the designated device in response to the scan instruction information through the communication I/F 55 is defined.

The scan instruction information is information to instruct execution of the reading operation, and includes condition information indicating the execution condition of the reading operation which is defined, for example, in the WF definition file shown in FIGS. 4A and 4B. The WF definition file will be described in detail later. The post-function of the job program "scan", for example, an operation to disconnect the communication connection with the designated device, and an operation to delete temporary files generated during execution of the pre-function and the do-function are defined.

A job program "load_from_local" executes the input job to retrieve the image data stored in the data storage area 62B. In the pre-function of the job program "load_from_local", operations to determine, for example, whether there is a defined file (hereinafter, referred to as a designation file) exists in the definition data, and whether authorization to retrieve the designated file is assigned to the information processing terminal 50 are defined. In the do-function of the job program "load_from_local", for example, an operation to retrieve a designated file from the data storage area 62B is defined. Further, in the post-function of the "load_from_local", for example, an operation to delete temporary files generated during execution of the pre-function and the do-function is defined.

A job program "download_from_cloud" executes the input job to receive the image data stored in the servers 80 and 81. In the pre-function of the "download_from_cloud", for example, operations to determine whether a communication with the servers 80 and 81 through the communication I/F 55 can be executed, whether account information to access the servers 80 and 81 is valid, whether the designated file exists in the servers 80 and 81 are defined.

In the do-function of the "download_from_cloud", for example operations to transmit download instruction information to the servers 80 and 81 through the communication I/F 55, and receive the image data which is transmitted by the servers 80 and 81 in response to the download instruction information through the communication I/F 55 are defined. It is noted that the download instruction information is information to instruct transmission of the designated files, and includes, for example, a file ID (e.g., a file path name) to identify the designated file.

In the post-function of the "download_from_cloud", for example, operations to disconnect the communication connection with the servers 80 and 81, to delete temporary files generated during execution of the pre-function and the do-function are defined.

A job program "edge_enhancement" executes the edit job to enhance the edges of images included in the image data. In the pre-function of the job program "edge_enhancement", for example, operations to determine whether image data of which format can be processed in the do-function is input in the input job, and to determine whether a sufficient memory area is allocated to develop the image data when the do-function is executed are defined. In the do-function of job program "edge_enhancement", for example, operations to detect edges of the images included in the image data and enhance the detected edges are included. In the pre-function of job program "edge_enhancement", for example an operation to delete temporary files generated during execution of the pre-function and the do-function.

A job program "text_extraction" executes an operation to extract character strings from an image of characters included in the image data. In the pre-function of the "text_extraction", for example, operations to determine whether image data of which format can be processed in the do-function in the input job, and whether a sufficient memory area is allocated in the data storage area 62B to develop the image data when the do-function is executed are defined.

In the do-function of the job program "text_extraction", for example, an operation to extract character strings from the image of characters included in the image data (i.e., so-called an OCR) is defined. In the post-function of the job program "text_extraction", for example an operation to delete temporary files generated during execution of the pre-function and the do-function.

A job program "print" executes the output job to transmit the image data subject to recordation by the printer 11 to the MFP 10. In the pre-function of the job program "print", for example, operations to determine whether communication with the designated device through the communication I/F 55 is available, whether consumables (e.g., ink, toner or the like) necessary for a printing operation is sufficiently available in the designated device, whether the designated device is executing another recording operation, and whether the designated device is configured to execute the printing operation in accordance with an execution condition defined in the definition data.

In the do-function of the job program "print", for example, an operation to transmit print instruction information to the designated device through the communication I/F 55 is defined. The print instruction information is information to instruct execution of the recording (printing) operation, and includes, for example, image data and condition information indicating an execution condition defined in the WF definition file. In the post-function of the job program "print", for example, an operation to delete temporary files generated during execution of the pre-function and the do-function.

A job program "save_to_local" executes the output job to store the image data in the data storage area 62B. In the pre-function of the job program "save_to_local", for example, operations to determine whether there exists a file having the same file name of the designate file, and to determine whether authorization to write data in f folder indicated by path information (described later) is assigned to the information processing terminal 50 are defined. In the do-function of the job program "save_to_local", for example, an operation to write the designated file in the data storage area 62B is defined. In the post-function of the job program "save_to_local", for example, an operation to delete temporary files generated during execution of the pre-function and the do-function is defined.

A job program "upload_to_cloud" executes the output job to transmit image data to be stored in the memories of the servers 80 and 81 to the servers 80 and 81. In the pre-function of the job program "upload_to_cloud", for example, operations to determine whether a communication with the servers 80 and 81 through the communication I/F 55 is available, to determine whether account information which is used to access the servers 80 and 81 is valid, and to determine whether there exists a file having the same file name of the designated file are defined. In the do-function of the job program "upload_to_cloud", for example, an operation to transmit upload instruction information to the servers 80 and 81 through the communication I/F 55 is defined. The upload instruction information is information to instruct storage of the designated file in the memories and include, for example, the designated file and path information indicating a location where the designated file is to be stored. In the post-function of the job program "upload_to_cloud", for example, operations to disconnect the communication connection with the servers 80 and 81, to delete temporary files generated during execution of the pre-function and the do-function are defined.

A job program "send_by_mail" executes the output job to transmit e-mail attaching the image data. In the pre-function of the job program "send_by_mail", for example, operations to determine whether communication with an SMTP server (not shown) through the communication I/F 55 is available, whether a mail count of a transmission source is valid, and whether a data size of the image data is less than a threshold size are defined. In the do-function of the job program "send_by_mail", for example, an operation to transmit the e-mail attaching the image data to the SMTP server through the communication I/F 55 in accordance with the SMTP protocol is defined. In the post-function of the job program "send_by_mail", for example, an operation to disconnect the communication connection with the SMTP server, and an operation to delete temporary files generated during execution of the pre-function and the do-function are defined.

It should be noted that the jobs the WF program 66 can execute are not limited to those shown in FIG. 3B. A job including a do-function to remove noise superimposed on the image data in the reading operation is an example of the edit job. A job including a do-function to transmit, to the designated device, the image data subject to a facsimile transmission by the designated device is an example of the output job.

It should also be noted that the pre-functions, do-functions and post-functions defined in association with respective job programs described above need not be limited to the described examples. For example, no post-function may be defined in each job program. In such a case, an operation corresponding to the post-function may be defined in a corresponding do-function, or may be incorporated in the WF program 66. In such a case, the WF program 66 may execute processes to release the resources of the information processing terminal 50 used in respective jobs at the same time, after execution of respective jobs defined in the WF definition file.

The data storage area 62B is configured to store WF definition files as shown in FIGS. 4A and 4B. The WF definition file is an example of definition data that defines a workflow. According to the illustrative embodiment, the WF definition file is a text file defining a workflow using the XML script. The WF definition file is stored in the data storage area 62B, for example, by the UI program that executes a WF registration process.

Although not shown in the drawings, data folders are provided in the data storage area 62B. The data folders may include, for example, a picture data folder "picture" configured to store photograph data and/or image data (e.g., JPEG format data, TIFF format data, BMP format data, etc.), and a document data folder "document" configured to store document data (e.g., doc format data, txt format data, RTF format data, etc.).

The servers 80 and 81 are so-called storage servers. Specifically, the servers 80 and 81 are configured such that data received from the information processing terminal 50 is stored in the memory (of the server 80 or 81), and the data designated by the information processing terminal 50 is retrieved from the memory and transmit the retrieved data to the information processing terminal 50. The server 82 is a server configured to supply job programs. Specifically, the server 82 is configured to retrieve a DLL file designated by the information processing terminal 50 from the memory thereof and transmit the retrieved DLL file to the information processing terminal 50. Since a hardware configuration of each of the servers 80, 81 and 82 is the configuration of a well-known storage server, detail description thereof is omitted for brevity.

Figure 7:
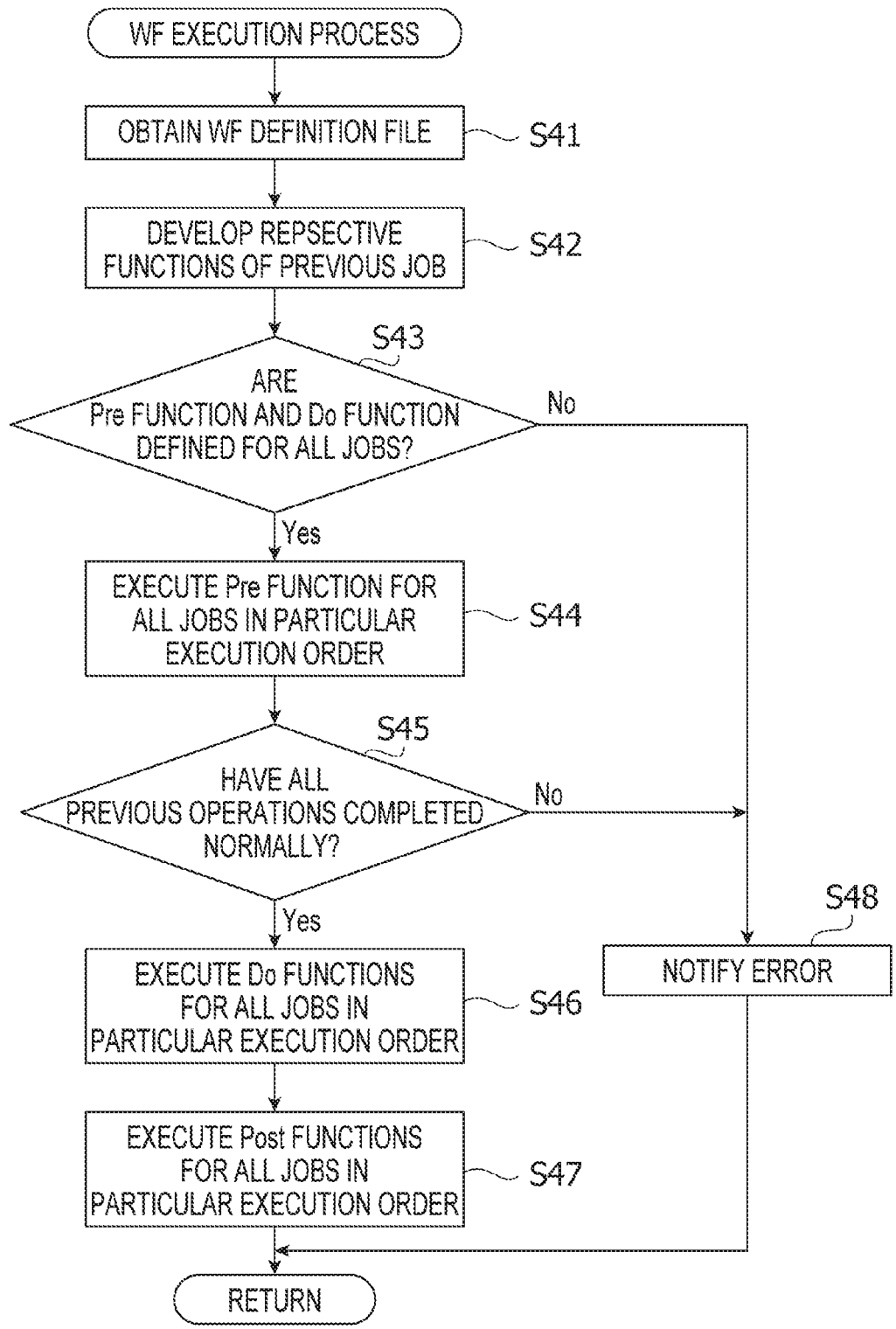
FIG. 7 is a flowchart illustrating a WF execution process executed in the information processing terminal according to the illustrative embodiment of the disclosures.

Now, referring to FIGS. 5-7, operations of the system 1000 according to the present disclosures will be described. The system 100 is configured such that, the UI program 65 registers the WF definition file generated in accordance with the user operation with the data storage area 62B, then the WF program 66 executes the workflow which is defined by the WF definition file designated by the user.

Firstly, the UI program 65 of the information processing terminal 50 executes the main process shown in FIG. 5 in response to invocation of the UI program 65 by the OS 64. The UI program 65 displays a main screen on the display 53 (S11). Then, the UI program 65 receives an operation with respect to the main screen by the user through the input I/F 54 (S12).

An example of the main screen shown in FIG. 8A includes a print icon 111, a scan icon 112, a (+) icon 113, and a device icon 114. The print icon 111 corresponds to an instruction to execute the job program "print" solely. The scan icon 112 correspond to an instruction to execute the job program "scan" solely. The (+) icon 113 corresponds to an instruction to newly generate the WF definition file. The device icon 114 correspond to an instruction to switch the designated devices. In the example shown in FIG. 8A, the device ID "MFP-A" identifying the current designated device is indicated at the device icon 114.

The UI program 65 executes the job program "print" in response to receipt of designation of the print icon 111 through the input I/F 54. That is, the UI program 65 causes the print 11 of the MFP 10A, which is the designated device, to execute the recording (printing) operation when the user designates the print icon 111 on the main screen. Further, the UI program 65 executes the job program "scan" in response to receipt of designation of the scan icon 112 through the input I/F 54. That is, the UI program 65 causes the scanner 12 of the MFP 10A, which is the designated device, to execute the reading operation when the user designates the scan icon 112 on the main screen.

Further, the UI program 65 receives a user operation to switch the designated device (S13) in response to receipt of designation of the device icon 111 through the input I/F 54 (S12: device icon). For example, the UI program 65 encourages the user to designate, through the input I/F 54, one of the MFPs 10A and 10B which are communicatable through the communication I/F 55. Then, in response to the user's designation of the MFP 10 (10A or 10B), the UI program 65 overwrites the device ID shown in FIG. 3A with the device ID of the MFP 10 designated by the user. Then, the UI program 65 displays the main screen including the updated device ID associated with the device icon 114 on the display 53 (S11).

Further, the UI program 65 executes a WF registration process (S14) in response to receipt of designation of the (+) icon 113 through the input I/F 54 (S12: (+) icon). The WF registration process is a process to generate the WF definition file in accordance with the user's instruction received through the input I/F 54, and store the generated WF definition file in the data storage area 62B.

FIG. 6 shows the WF registration process in detail. The UI program 65 displays a WF type selection screen, which is an example of a first screen, on the display 53 (S21). The WF type selection screen is a screen encouraging the user to select one of the input job and the output job as a job to be executed by the designated device. FIG. 8B shows an example of the WF type selection screen. Then, the UI program 65 receives the user operation with respect to the WF type selection screen through the input I/F 54 (S22). It is noted that a process in S21 is an example of a first displaying process, and a process in S22 is an example of a reception process and a first reception process.

It is noted that the WF type selection screen shown in FIG. 8B is a popup screen overlaid on the main screen. The WF type selection screen includes a "print type" icon 116 and a "scan type" icon 117. The "print type" icon 116 is an example of a second object corresponding to the output job using the designated device. That is, the "print type" icon 116 corresponds to the class "print". The "scan type" icon 116 is an example of a first object corresponding to the input job using the designated device. That is, the "scan type" icon 117 corresponds to the class "scan".

Next, the UI program 65 temporarily stores the name of the class "print", which correspond to the "print type" icon 116, in the data storage area 62B in response to receipt of designation of the "print type" icon 116 through the input I/F 54. Further, the UI program 65 displays a source location selecting screen, which is an example of a third screen, on the display 53 (S23). It is noted that the source location selection screen is a screen on which the user can select a source location of the image data in the input job. FIG. 9A is an example of the source location selection screen. Then, the UI program 65 receives the user operation with respect to the source location selection screen through the input I/F 54 (S24). It is noted that a process in S23 is an example of a third display process, and a process in S24 is an example of the reception process and a third reception process.

The source location selection screen shown in FIG. 9A is a popup screen overlaid on the main screen. The source location selection screen includes multiple source location icons 121, 122 and 123. It is noted that the source location icons 121, 122 and 123 are examples of source location objects respectively corresponding to the source locations of the image data in the input job. Specifically, according to the present embodiment, the source location icon 121 corresponds to the document data folder "document", the source location icon 122 corresponds to the photograph data folder "picture", and the source location icon 123 corresponds to the servers 80 and 81. Further, the source location icons 121 and 122 correspond to the class "load_from_local" and the source location icon 123 corresponds to the class "download_from_cloud". It is noted that the class names associated with the source location icons 121-123 are examples of first candidate identifiers.

In response to receipt of designation of the source location icon 121 through the input I/F 54, the UI program 65 temporarily stores the class name "load_from_local" and the data source location "document" in the data storage area 62B. Then, the UI program 65 displays the WF registration screen on the display 53 (S25). The WF registration screen is a screen through which the user can designate an execution condition of each of the designated jobs. The UI program 65 receives the user operation with respect to the WF registration screen through the input I/F 54 (S26). It is noted that the process in S26 is an example of the reception process.

FIG. 9B shows an example of the WF registration screen when the "print type" icon 116 and the source location icon 121 have been designated. The WF registration screen shown in FIG. 9B includes an input condition designation area 131, an output condition designation area 132, a "reg- ister" icon 133 and a "cancel" icon 134. The input condition designation icon area 131 is an area in which the user can designate the execution condition of the input job, and includes a setting icon 135. The output condition setting area 132 is an area in which the user can designate the execution condition of the designated output job, and includes setting icons 136 and 137. The "register" icon 133 corresponds to an instruction to register a new WF definition file generated in accordance with the user operation in the WF registration process. The "cancel" icon 134 corresponds to an instruction to terminate the WF registration process without registering the WF definition file.

The setting icon 135 corresponds to an instruction to designate a designated file. That is, in response to receipt of designation of the setting icon 135 (S26: setting), the UI program 65 receives the user operation to designate one of multiple pieces of document data stored in the document data folder "document" through the input I/F 54. Then, the UI program 65 temporarily stores data ID of the designated document data as the condition information of the input job in the data storage area 62B (S27). Further, the UI program 65 displays the WF registration screen on which the data ID of the designated document data (e.g. "/document/ESTIMATE.doc") is indicated in the input condition designation area 131 on the display 53 (S25).

The setting icon 136 corresponds to an instruction to designate the size of the recording sheets which are used in the recording (printing) operation. That is, in response to receipt of the designation of the setting icon 136 through the input I/F 54 (S26: setting), the UI program 65 receives the user operation to designated one of the multiple sizes (e.g., A4 size, B5 size, Letter size, etc.) through the input I/F 54. Then, the UI program 65 temporarily stores size information representing the designated size in the data storage area 62B as condition information of the output job (S27). Further, the UI program 65 displays the WF registration screen in which the designated size (e.g., "A4") is indicated in the output condition designation area 132 on the display 53 (S25).

The setting icon 137 corresponds to an instruction to designate a color to be used in the recording (printing) operation. That is, in response to receipt of the designation of the setting icon 137 through the input I/F 54 (S26: setting), the UI program 65 receives the user operation to designate a color (e.g., "full color", "monochrome") to be used in the recording operation through the input I/F 54. Then, the UI program 65 temporarily stores color information representing the designated color in the data storage area 62B as the condition information of the output job (S27). Further, the UI program 65 displays the WF registration screen in which the designated color (e.g., "monochrome") is indicated in the output condition designation area 132 on the display 53 (S25).

It is noted that the setting icons indicated in the input condition designation area 131 and the output condition designation area 132 are different for different jobs. Further, when the source location icon 121 is designated, the setting icon indicated in the input condition designation area 131 is not limited to one shown in FIG. 9B. For example, in a case shown in FIG. 9B, the input condition designation area 131 may further indicate another setting icon to designate a part of a plurality of pages included on the designated document data. Further, when the "print type" icon 116 is designated, the setting icon indicated in the output condition designation area 132 is not limited to ones indicated in FIG. 9B. For example, in a case shown in FIG. 9B, the output condition designation area 132 may further indicate a setting icon to designate whether a duplex printing is to be executed, a setting icon to designate an image quality, a setting icon to designate a layout printing, and the like.

Next, in response to receipt of designation of the "register" icon 133 through the input I/F 54 (S26: register), the UI program 65 generates the WF definition file using the information temporarily stored in the data storage area 62B in the WF registration process, stores the thus generated WF definition file in the data storage area 62B (S28), and terminates the WF registration process. It is noted that a process in S28 is an example of a storing process. In response to receipt of designation of the "cancel" icon 134 through the input I/F 54 (S26: cancel), the UI program 65 terminates the WF registration process without executing S28.

When the "register" icon 133 included in the WF registration screen shown in FIG. 9B is designated, the WF definition file (see FIG. 4A) is generated. The WF definition file as shown in FIG. 4A is generated. It is noted that the WF definition file shown in FIG. 4A includes the input job defined as an element between tags <input> and </input>, and the output job defined as an element between tags <output> and </output>.

The <input> tag contains the class name "class=download_to_local" which was temporarily stored in S24 and order information "order=1". It is noted that the class name contained in the <input> tag is an example of a first identifier, and the job program identified by the first identifier is an example of a first program. Further, in the input job shown in FIG. 4A, an element between tags <file> and </file>. The element between the tags <file> and </file> contains the data ID ("/document/ESTIMATE.doc") of the designated file which was designated through the setting icon 135.

The <output> tag contains the class name "class=print" temporarily stored in S22 and order information "order=2". It is noted that the class name contained in the <output> tag is an example of a second identifier, and the job program identified by the second identifier is an example of a second program. Further, the output job shown in FIG. 4A includes an element between tags <device> and </device>, an element between tags <size> and </size>, an element between tags <size> and </size>, and an element between tags <color> and </color>. The element between the tags <device> and </device> includes the device ID "MFP-A" of the designated device. The element between the tags <size> and </size> includes the size information "A4" which was designated through the setting icon 136. The element between the tags <color> and </color> includes the color information "mono" designated through the setting icon 137.

The element between the tags <input> and </input> shown in FIG. 4A defines an input job which causes the WF program 66 to input the data identified by the data ID "/document/ESTIMATE.doc" by executing the job program "load_from_local". Further, the element between the tags <output> and </output> shown in FIG. 4A defines an output job which causes the designated device "MFP-A" to execute a recording operation to record (print) an image identified by the designated file "ESTIMATE.doc" on a A4 size recording sheet by executing the job program "print".

The order information "order" is information indicating the execution order of multiple jobs defined in the WF definition file. That is, the multiple jobs defined in the WF definition file are executed according to ascending order of the order information "order". It is noted that, to the order information of the input jobs, values smaller than those of the edit jobs or the output jobs are assigned. Further, to the order information of the edit jobs, values smaller than those of the output jobs are assigned. Accordingly, the multiple jobs are executed in the order of the input jobs, the edit jobs and the output jobs. When the workflow includes multiple input jobs, the order information of the input jobs designated earlier may be assigned with smaller values. Alternatively, a user operation to designate the order information may be received through the input I/F 54. So are cases where the workflow includes multiple edit jobs and/or multiple output jobs.

It should be noted that the definition of the workflow in the WF definition file need not be limited to those illustrated with reference to FIGS. 4A and 4B. For example, the WF definition file may not explicitly include the order information. In such a case, the WF program 66 may execute multiple jobs defined in the WF definition file in the order of definitions in the WF definition file. In other words, the WF program 66 may execute the multiple files from the top of the WF definition file. According to such a viewpoint, the WF definition, in which multiple jobs are defined in the order of execution, can be regarded as an example of the order information.

In response to receipt of designation of the "scan type" icon 117 on the WF type selection screen through the input I/F 54 (S22: scan type), the UI program temporarily stores a name of the class "scan" corresponding to the "scan type" icon 117 in the data storage area 62B. Further, the UI program 65 displays an output destination selection screen, which is an example of a second screen, on the display 53 (S29). The output destination selection screen is a screen on which the user can select an output destination of the image data in the output job. FIG. 10A shows an example of the output destination selection screen. Then, the UI program 65 receives a user operation with respect to the output destination selection screen through the input I/F 54 (S30). It is noted that the process in S29 is an example of the second display process, and the process in S30 is an example of the receiving process and the second receiving process.

The output destination selection screen shown in FIG. 10A is a popup screen overlaid on the main screen. The output destination selection screen includes multiple output destination icons 141, 142 and 143. The output destination icons 141-143 are examples of output destination objects corresponding to the destinations of the image data in the output job. According to the illustrative embodiment, the output destination icon 141 corresponds to the photograph data folder "picture", the output destination icon 142 corresponds to the servers 80 and 81, and the output destination icon 143 corresponds to the e-mail. Further, the output destination icon 141 corresponds to the class name "save_to_ local", the output destination icon 142 corresponds to the class name "upload_to_cloud" and the output destination icon 143 corresponds to the class name "send_by_mail". The class names associated with the output destination icons 141-143 are examples of a second candidate identifier.

In response to receipt of designation of, for example, the output destination icon 142 through the input I/F 54 (S30: YES), the UI program 65 temporarily stores the class name "upload_to_cloud" corresponding to the output destination icon 142 in the data storage area 62B. Next, the UI program 65 displays the WF registration screen on the display 53 (S25). Processes in S25 onwards are similar to those in the previous example except that the execution conditions that can be designated on the WF registration screen are different from the previous example. FIG. 10B shows an example of the WF registration screen when the "scan type" icon 117 and the output destination icon 142 are designated. In the WF registration screen shown in FIG. 10B, the input condition designation are 131 indicates setting icons 146 and 147, and the output condition designation area 132 indicates a setting icon 148.

The setting icon 146 corresponds to an instruction to designate a color mode in the scanning operation. That is, in response to receipt of designation of the setting icon 146 through the input I/F 54 (S26: set) the UI program 65 receives a user operation to designate the color mode (e.g., "color" or "monochrome") of the reading operation through the input I/F 54. Then, the UI program 65 temporarily stores color information representing the designated color mode as the condition information of the input job in the data storage area 62B (S27). Further, the UI program 65 displays the WF registration screen on which the designated color mode (e.g., "color") is indicated in the input condition designation area 131 on the display 53 (S25).

The setting icon 147 corresponds to an instruction to designate a resolution of image data generated in the reading operation. That is, in response to receipt of designation of the setting icon 147 through the input I/F 54 (S26: set), the UI program 65 receives a designating operation to designate the resolution (e.g., "300 dpi", "600 dpi", "900 dip" etc.) through the input I/F 54. Then, the UI program temporarily stores resolution information representing the designated resolution as the condition information of the input job in the data storage area 62B (S27). Further, the UI program 65 displays the WF registration screen on which the designated resolution (e.g., "600 dpi") is indicated in the input condition designation area 131 on the display 53 (S25).

The setting icon 147 corresponds to an instruction to designate a file path of the image data stored in the output job. That is, in response to receipt of designation of the setting icon 147 through the input I/F 54 (S26: SET), the UI program 65 receives the user operation to designate an output destination of the image data through the input I/F 54. Then, the UI program 65 temporarily stored output destination information indicating the designated output destination as the condition information of the output job in the data storage area 62B (S27). Further, the UI program 65 displays the WF registration screen on which the designated output destination (e.g., "www.server=B.com/share/$DATE.jpeg") is indicated in the output condition designation area 132 on the display 53 (S25). It is noted that the output destination information in the example of FIG. 10B includes the server ID "www.server-B.com" identifying the server 81 and the path information "/share/$DATE.jpeg" indicating the output destination of the image data inside the server 81. It is noted that a character string "DATE" is a control symbol which functions such that a portion of "DATE" is replaced with the date on which the output job is executed.

Further, when the "scan type" icon 117 is selected, the setting icons indicated in the input condition designation area 131 need not be limited to those shown in FIG. 10B. For example, the input condition designation screen 131 may further include a setting icon allowing the user to select a file format of the image data generated in the reading operation. It is noted that, when the output destination icon 142 is designated, the setting icon indicated in the output condition designation area 132 needs not be limited to that shown in FIG. 10B. For example, in such a case, the output condition designation area 132 may further include a setting icon allowing the user to designate account information for accessing the server 81.

Although not shown in the drawings, the UI program 65 may be configured to receive the user operation to designate an edit job to be included in a workflow through the input I/F 54. In the following description of the present embodiment, it is assumed that edit jobs identified by the class name "edge_enhancement" and the class name "text_extraction" are designated after the "scan type" icon 117 is designated and before the "register" icon 133 shown in FIG. 10B is designated.

When the "register" icon 133 in the WF registration screen (see FIG. 10B) is designated, the WF definition file indicated in FIG. 4B is generated. The WF definition file shown in FIG. 4B includes the input job which is defined as an element between the <input> tag and the </input> tag, two edit jobs each of which is defined by <filter/> tag, and the output job defined as an element between the <output> tag and the </output> tag.

The <input> tag shown in FIG. 4B includes the class name "class=scan" which was temporarily stored in S22 and the order information "order=1" within the tag. Further, the input jobs shown in FIG. 4B includes an element between a <device> tag and a </device> tag, an element between the <color> tag and the </color> tag, and an element between the <resolution> tag and the </resolution> tag.

The element between the <device> tag and the </device> tag included the device ID "MFP-A" which identifies the designated device. The element between the <color> tag and the </color> tag includes the color information "multi" designated through the setting icon 146. The element between the <resolution> tag and the </resolution> tag includes the resolution information "600" which was designated through the setting icon 147.

Among tow <filter> tags, the upper <filter> tag includes the class name "class=edge_enhancement" and the order information "order=2" within the tag. The lower <filter> tag includes the class name "class=text_extraction" and the order information "order=3" within the tag.

The <output> tag includes the class name "class=upload_to_cloud" which was temporarily stored in S30 and the order information "order=4" within the tag. The output job shown in FIG. 4B includes an element between the <device> tag and the </device> tag, an element between the <file> tag and the </file> tag, and an element between the <account> tag and the </account> tag.

The element between the <device> tag and the </device> tag includes the server ID "www.server=B.com" which was designated through the setting icon 148. The element between the <file> tag and the </file> tag includes the path information "/share/$DATE.jpeg" which was designated through the setting icon 148. The element between the <account> tag and the </account> tag includes the account information which was input through a not-shown setting icon. In the example shown in FIG. 4B, the account information is a combination of the account ID "user A" and a pass "1234".

The element between the <input> tag and the </input> tag shown in FIG. 4B defines the input job which causes the designated device "MFP-A" to execute the reading operation to generate the image data representing a color image having the resolution of 600 dpi by executing the job program "scan". The <filter> tag shown in FIG. 4B defines the edit job to apply edge enhancement to the image input by the input job and extract character strings from the edge-enhanced image by executing the job program "edge_enhancement" and the job program "text_extraction" in this order.

Further, the element between the <output> tag and the </output> tag defines the output job to store the designated file to which the edit jobs have been applied in the folder "share" of the server 81 as a file of which name is a combination of the date on which the output job is executed and a character string "jpeg" by executing the job program "upload_to_cloud".

In S11 of FIG. 5, the UI program 65 displays the main screen which further includes the WF icons 151 and 152 as shown, for example, in FIG. 11A on the display 53. The WF icon 151 corresponds to the WF definition file shown in FIG. 4A, and the WF icon 152 corresponds to the WF definition file shown in FIG. 4B. That is, in the main screen, two WF icons respectively corresponding to the WF definition files stored in the data storage area 62B are displayed on the main screen. That is, FIG. 11A shows the main screen after the WF registration process is executed twice and the two WF definition files indicated in FIGS. 4A and 4B has been stored in the data storage area 62B.

Next, in response to receipt of designation of, for example, the WF icon 151 (S12: WF icon), the UI program 65 displays the WF execution screen on the display 53 (S15). Then, the UI program 65 receives the user operation with respect to the WF execution screen (S16). It is noted that a process of S12 in which the UI program 65 receives designation of one of the WF icon 151 and 152 in S12 is an example of a designation receiving process.

FIG. 11B shows an example of the WF execution screen when the WF icon 151 is designated. The WF execution screen shown in FIG. 11B includes an input condition display area 161, an output condition display area 162, an "execute" icon 163 and a "cancel" icon 164. The "execute" icon 163 corresponds to an execution instruction of a workflow defined in the designated WF definition file. The "cancel" icon 164 corresponds to an instruction to display the main screen without executing a workflow.

The input condition display area 161 is an area in which an input job defined as an element between the <input> tag and the </input> tag in the WF definition file corresponding to the WF icon 151 is displayed. The output condition display area 162 is an area in which an output job defined as an element between the <output> tag and the </output> tag in the WF definition file corresponding to the WF icon 151 is displayed.

The displayed contents in the input condition display area 161 and the output condition display area 162 are substantially the same as the contents in the input condition designation area 131 and the output condition designation area 132 shown in FIG. 9B. It is noted, however, the input condition display area 161 and the output condition display area 162 are different from the input condition designation area 131 and the output condition designation area 132 in a point that the input condition display area 161 and the output condition display area 162 do not acquire change of the execution conditions.

In response to receive of designation of the "execute" icon 163 through the input I/F 54 (S16: EXECUTE), the UI program 65 executes the WF execution process (S17). Alternatively, in response to receipt of designation of the "cancel" icon 164 through the input I/F 54 (S16: CANCEL), the UI program 65 executes processes in S11 onwards without executing the WF execution process.

The WF execution process is a process of causing the WF program 66 6o execute the workflow defined in the designated WF definition file. That is, the UI program 65 starts the WF program with using the WF definition file data ID corresponding to the designated WF icon 151 as a start argument.

Now, referring to FIG. 7, the WF execution process will be described in detail. In response that the WF program 66 is started by the UI program 65, the WF program 66 retrieves the WF definition file identified by the data ID designated by the start argument from the data storage area 62B (S41). That is, according to the illustrative embodiment, the WF definition file shown in FIG. 4A is retrieved. It is noted that the process in S41 is an example of an obtaining process.

Next, the WF program 66 retrieves the class name from the WF definition file obtained in S41. Then, the WF program 66 develops respective functions defined in the job programs identified by the retrieved class name in the memory 62 (S42). Specifically, the WF program 66 develops the pre-function defined in the job program "download_to_local" and the pre-function defined in the job program "print" in a pre-array, which has been defined in advance to develop the pre-functions, in accordance with the ascending order of the order information. In this case, the pre-function of each job program may be developed in the pre-array using the corresponding order information as an index. Similarly, the WF program 66 develops a do-function of each job program in a do-array, and develops a post-function in each job program in a post-array. It is noted that the process in S42 is an example of a developing process.

Next, the WF program 66 determines whether both the pre-function and the do-function are defined in all the job programs defined in the WF definition file (S43). Specifically, the WF program 66 refers to the pre-array and do-array in which functions are developed in S42. It is noted that the process in S43 is an example of a second determining process to determine whether both the pre-operation and the main-operation are defined in all the jobs.

Next, in response to determination that both the pre-function and the do-function are defined in all the job programs (S43: YES), the WF program 66 starts the pre-functions of all the job programs defined in the WF definition file in accordance with the execution order indicated by the order information (S44). That is, the WF program 66 starts multiple pre-functions developed in the pre-array in S42 in accordance with the ascending order of the indexes thereof. It is noted that the process in S44 is an example of pre-process in which the pre-operations defined to respective ones of the multiple jobs according to a particular order.

The WF program 66 according to the illustrative embodiment determines whether the designated file "/document/ESTIMATE.doc" exists, and the information processing terminal 50 is authorized to retrieve the designated file by executing the pre-function of the job program "load_from_local". Further, the WF program 66 according to the illustrative embodiment determines whether a communication with the MFP 10A, which is the designated device, through the communication I/F 55 is available, whether consumables necessary for the recording operation are remained in the MFP 10A, whether the MFP 10A is executing another recording operation, and whether the MFP 10A is configured to execute the recording operation in accordance with the execution condition defined in the WF definition file, by executing the pre-function of the job program "print".

Next, the WF program 66 determines whether all the pre-functions executed in S44 have completed successfully (S45). It is noted that the "successful completion of the pre-function" means, for example, a condition that, as a result of execution of a pre-function, it is confirmed that a do-function corresponding to the pre-function is in condition for execution. In other words, for example, when the pre-function has successfully completed, it is confirmed that all checking items which are examined in the pre-function do not prevent execution of the do-function corresponding to the pre-function. It is noted that the process in S45 is an example of a first determination process in which it is determined whether each of the pre-operations defined for all the jobs has successfully completed in a pre-process stage.

That is, when a pre-function of the job program "load_from_local" has successfully completed, it is confirmed that the designated file "/document/ESTIMATE.doc" exists, and the information processing terminal 50 is authorized to retrieve the designated file. When a pre-function of the job program "print" has successfully completed, it is confirmed that a communication with the MFP 10A through the communication I/F 55 is available, the consumables necessary for executing the recording operation remain in the MFP 10A, the MFP 10A is not executing another recording operation, and the MFP 10A is configured to execute the recording operation in accordance with the execution condition defined in the WF definition file.

Next, in response to determination that all the pre-functions have successfully completed (S45: YES), the WF program 66 starts do-functions of all the job programs defined in the WF definition file in accordance with the execution order indicated by the order information (S46). That is, the WF program 66 executes multiple do-functions developed in the do-array in S42 in accordance with the ascending order of the indexes. It is noted that the process in S46 is an example of a main process in which main-operations respectively defined for multiple jobs in a particular order.

The WF program 66 according to the illustrative embodiment retrieves the designated file "/document/ESTIMATE.doc" from the document data folder and converts the retrieved designated file into image format data by executing the do-function of the job program "load_from_local". Further, the WF program according to the illustrative embodiment transmits print instruction information to the MFP 10A through the communication I/F 55 by executing the do-function of the job program "print". It is noted that the print instruction information transmitted to the MFP 10A includes image format data version of the designated file "ESTIMATE.jpeg", and the condition information including the size information "A4" and the color information "B & W".

Although not shown in the drawings, a device program 35 of the MFP 10A is configured to receive the print instruction information from the information processing terminal 50 through the communication I/F 25. Then, the device program 35 causes the printer 11 to execute a recording operation in accordance with the received print instruction information. That is, the printer 11 records (prints) an image represented by the designated file "ESTIMATE.jpeg" on the A4 size recording sheet as a black and white image.

Next, the WF program 66 sequentially starts the post-functions of all the job programs defined in the WF definition file in the execution order indicated in the order information (S47). That is, the WF program 66 starts the multiple post-functions developed in the post-array in S42 in the ascending order of the indexes. It is noted that the process in S47 is an example of a post process in which post-operations respectively defined for the multiple jobs sequentially.

The WF program 66 according to the illustrative embodiment is configured to delete temporary files generated during execution of the pre-functions and do-functions by executing the post-function of the job program "load_from_local". Further, the WF program 66 according to the illustrative embodiment disconnect a communication connection with the MFP 10A and delete the temporary files generated during execution of the pre-functions and do-functions by executing the post-function of the job program "print".

In response to determination that at least one of the pre-function and the do-function is not defined in at least one job program (S43: NO), the WF program 66 displays an error screen on the display 53 without executing the process in S44-S47. The error screen displayed in S48 may include a message such as "an unauthorized job is included in the WF definition file. Class=*". It is noted that the character string * above should be replaced with the class name of the job program in which at least one of the pre-function and the do-function is not included.

In response to determination that at least one pre-function has abended (S45: NO), the WF program 66 displays an error screen on the display 53 (S48) without executing the process of S46 and S47. In this case, for example, the class name(s) of the job program including the pre-function which has abended and reason(s) why it is determined that the do-function cannot be executed may be listed. It is noted that "abend of the pre-function" is a condition, for example, in which it is confirmed that the do-function corresponding to the pre-function cannot be executed as a result of execution of the pre-function. In other words, the "abend of the pre-function" means that at least one of items to be checked in the pre-function is confirmed to prevent execution of the do-function.

Thus, the abend of the pre-function of the job program "load_from_local" implies that it is confirmed that the designated file "/document/ESTIMATE.doc" does not exist, or it is confirmed that the information processing terminal 50 is not authorized to retrieve the designated file. Further, the abend of the pre-function of the job program "print" implies that it is confirmed that the communication with the MFP 10 through the communication I/F 55 is not available, it is confirmed that sufficient consumables are nor remained in the MFP 10A, it is confirmed that the MFP 10A is executing an another recording operation or it is confirmed that the MFP 10A cannot execute the recording operation in accordance with the execution condition defined in the WF definition file.

The error screen when it is confirmed, during execution of the pre-function of the job program "print" that a communication with the MFP 10A is not available may include a message saying that connection with the designated device is not available. Class name="print". The process in S48 is an example of a notification process to cause the notification I/F to notify that a job defined in the WF definition file cannot be executed. That is, the display 53 displaying the error message is an example of the notification I/F. It is noted that the notification I/F need not be limited to the display 53, and may be configured by a speaker or the like (not shown) which is configured to output audible guidance.

In the workflow defined in the WF definition file shown in FIG. 4A, if, for example, the functions defined in respective job programs are executed in order, the pre-function of the job program "print" will abend after the pre-function, the do-function, and the post-function of the job program "load_from_local" are executed. In this case, the user of the information processing terminal 50 should consume a time period during which the respective functions of the job program "load_from_local" are executed, although the workflow will not be successfully completed.

According to the illustrative embodiment, in response to one of the pre-functions defined in multiple job programs constituting a workflow abends, the do-function will not be executed and the user is notified that the workflow will not be executed. As a result, the user is notified that the workflow will not be executed at an earlier stage. According to the illustrative embodiment above, determination of S45 is executed after all the pre-functions are executed. Aspects of the disclosures need not be limited to such a configuration. For example, in response to abend of one of the pre-functions, the process in S44 may be terminated and the process in S48 may executed.

In the illustrative embodiment described above, an example in which it is determined that the pre-function has normally completed when it is confirmed that none of the checking items to be checked in the pre-function prevents execution of the do-function. Aspects of the present disclosures need not be limited to such a configuration. For example, among the multiple checking items to be checked in the pre-function, ones which do not require the user's resolving operations may be excluded from the determination in S45. It is noted that an item which "does not require the user's resolving operation" is an item of which a problem may be automatically resolved as time elapses, without the user's operation.

For example, in executing the pre-function of the job program "scan", determining whether the designated device is executing another reading operation can be excluded from items subject to determination in S45. It is because, if the designated device waits for completion of the reading operation currently executed, it becomes possible to cause the designated device to execute the reading operation defined in the workflow. For another example, in the pre-function of the job program "print", determination whether the designated device is executed another reading operation may be excludes from the items subject to determination in S45. It is because, when the currently executed reading operation is completed, it becomes possible to cause the designated device to execute the recording operation defined in the workflow.

Further, according to the above-described embodiment, whether both the pre-functions and the do-functions are defined in all the job programs constituting the workflow is examiner prior to execution of the same. Therefore, if there exists a job program in which the pre-function and/or do-function is not defined, a condition that the workflow will abend can be notified to the user of the information processing terminal 50 at an early stage. Such an examining/notifying process is particularly effective when the job program is supplied by a third party. It is noted that, in S43, it may be further examined whether post-functions are defined in all the job programs constituting the workflow.

According to the above-described embodiment, the user is requested to designate the job to be executed by the designated device through the WF type selection screen, and one of the source location selection screen and the output destination selection screen is displayed depending on the result of the user's designation. As a result, the user can generate a relatively simple workflow by making a selection from among multiple selections of the input jobs and the output jobs with a relatively simple operation. It is noted, however, the interface to generated the WF definition file needs not be limited to the configuration employed in the above-described embodiment. For example, the XML shown in FIG. 4A or 4B may be directly input using a text editor, and a text file created by the text editor may be imported in the WF program 66.

As described above, the workflow defined by the WF definition file is advantageous since flexibility in combining jobs is high, and combination of the jobs can be made easily. Further, the WF program 66 is configured to examine whether necessary functions (e.g., pre-functions) are defined in all the jobs included in the workflow and execute the pre-functions, prior to execution of the do-functions. Therefore, the flexibility and facility is secured, and further, exclusion of dead time is also realized.

Further, according to the above-described embodiment, the workflow corresponding to the WF icon which the user designated from among the multiple WF icons 151 and 152 included in the main screen is executed. With this configuration, it becomes possible to cause the information processing terminal 50 to execute the user-desired workflow. It is noted that WF program 66 needs not be started by the UI program 65. For example, a well-known scheduling program installed in the information processing terminal 50 may start the WF program 66 designating the WF file which is designated by the user, at a user-designated timing.

According to the above-described embodiment, in the MFP 10 and the information processing terminal 50, programs are stored in the program storage areas 32A and 62A of the memories 32 and 62, which are to be executed by the CPUs 31 and 67, respectively. As the CPU's 31 and 61 execute the programs, the controllers execute the respective processes described above. It is noted that the configurations of the controllers need not be limited to ones described above. A part of, or all of the configurations may be realized by another hardware such as IC's or the like.

It is note that the operations/functions described above are realized by the MFP 10 and/or the information processing terminal 50. Further, the operation/functions may be realized by programs that cause the MFP 10 and/or the information processing terminal 50 to execute the same. Such programs may be stored in the non-transitory recording medium, which may be distributed. It is noted that the non-transitory recording medium may include a storage provided to a server which is connectable to the MFP 10 and the information processing terminal 50 through a communication network, in addition to CD-ROM's and DVD-ROM's. The programs stored in the server may be distributed as information or signals representing the programs, or through a communication network such as the Internet.

What is claimed is:

1. A non-transitory computer-readable recording medium storing computer-readable instructions which are readable by a controller of a device provided with a communication interface and a notification interface, the computer-readable instructions comprising a workflow program and a plurality of job programs, the plurality of job programs respectively corresponding to a plurality of jobs and defining corresponding ones of the plurality of jobs, each of the plurality of job programs defining at least a pre-operation and a main-operation of the corresponding one of the plurality of jobs, the pre-operation being an operation to be executed prior to execution of the main-operation of the corresponding one of the plurality of jobs, the computer-readable instructions, when executed by a controller of the device, causing the device to:
obtain a workflow definition file defining the plurality of jobs to be executed and an execution order of the plurality of jobs, the plurality of jobs including an input job and an output job, the input job causing a scanner to execute a reading operation to read an image on an original and generate image data representing the read image, and an output job to output the image data which is obtained in the input job,
start a pre-process in accordance with an execution order of the plurality of jobs defined in the workflow definition file, the pre-process being the pre-operations respectively defined in each the plurality of job programs respectively corresponding to the plurality of jobs defined in the workflow definition file, determine whether the pre-operations corresponding to all the plurality of jobs defined in the workflow definition file have been started and successfully completed;

in response to determination that the pre-operations defined in all the plurality of jobs defined in the workflow definition file have successfully completed, start a main-process in accordance with the execution order of the plurality of jobs defined in the workflow definition file, the main-process being the main-operations respectively defined in each of the plurality of job programs respectively corresponding to the plurality of jobs defined in the workflow definition file, wherein the main-operation defined in the input job is an operation to receive the image data generated in the reading operation from the scanner through the communication interface, wherein the main-operation defined in the output job is an operation to output the image data; and in response to determination that at least one of the pre-operations defined in all the plurality of jobs defined in the workflow definition file has abended, cause the notification interface to notify that the plurality of jobs defined in the workflow definition file are inexecutable.

2. The non-transitory computer-readable recording medium according to claim 1, wherein the computer-readable instructions, when executed by the controller, further cause the device to execute a post-process in which multiple post-operations are executed, the post-operations being operations to release resources of the device used in corresponding main-operations and defined in the plurality of jobs, respectively.

3. The non-transitory computer-readable recording medium according to claim 1, wherein an edit job to edit the image data input in the input job is further defined, and wherein the output job outputs the image data having been edited in the edit job.

4. The non-transitory computer-readable recording medium according to claim 1, wherein the pre-process defined in the input job causing the scanner to read the image on the original and generate the image data is one of:

determining whether a communication with the scanner through the communication interface is available;

determining whether the scanner is executing another reading operation; and determining whether the scanner is configured to execute the reading operation in accordance with an execution condition defined in the definition data.

5. The non-transitory computer-readable recording medium according to claim 1, wherein the pre-process defined in the output job causing a printer to record an image represented by the image data on a sheet is one of:

determining whether a communication with the printer through the communication interface is available;

determining whether the printer is executing another recording operation; and determining whether the printer is configured to execute the recording operation in accordance with an execution condition defined in the definition data.

6. The non-transitory computer-readable recording medium according to claim 1, wherein the pre-operation is an operation to check whether the multi-function peripheral is in a state where the corresponding main-operation can be executed.

7. A non-transitory computer-readable recording medium storing computer-readable instructions which are readable by a controller of a device provided with a communication interface and a notification interface, the computer-readable instructions, when executed by a controller of the device, causing the device to obtain definition data in which a workflow is defined, the workflow containing multiple jobs including an input job and an output job, the input job causing a scanner to execute a reading operation to read an image on an original and generate image data representing the read image, and an output job to output the image data which is obtained in the input job, the computer-readable instructions causing the device to execute a pre-process in which pre-operations respectively defined in the multiple jobs contained in the workflow in order, the pre-operations being operations to examine whether the multiple jobs being executable, wherein the computer-readable instructions, when executed by the controller, further cause the device to perform:

determining whether the pre-operations defined in all the multiple jobs contained in the workflow have successfully completed;

in response to determination that the pre-operations defined in all the multiple jobs contained in the workflow have successfully completed, causing the device to execute a main-process in which main-operations respectively defined in the multiple jobs contained in the workflow in order, wherein the main-operation defined in the input job is an operation to receive the image data generated in the reading operation from the scanner through the communication interface, wherein the main-operation defined in the output job is an operation to output the image data; and in response to determination that at least one of the pre-operations defined in all the multiple jobs has abended, causing the notification interface to notify that the multiple jobs defined in the workflow are inexecutable;

wherein the computer-readable instructions, when executed by the controller, further cause the device to perform:

determining whether both the pre-operation and the main-operation are defined in each of the multiple jobs;

in response to determination that both the pre-operation and the main-operation are defined in each of the multiple jobs, causing the device to execute the pre-operations; and in response to determination that at least one of the pre-operation and the main-operation is not defined in at least one of the multiple jobs, causing the notification interface to notify that the multiple jobs defined in the workflow are inexecutable.

8. The non-transitory computer-readable recording medium according to claim 7, wherein the device has a memory, wherein the definition data includes a first identifier, a second identifier and order information indicating an execution order of the input job and the output job, the first identifier identifying a first program executing the input job, the second identifier identifying a second program executing the output job, functions realizing the pre-operation and the main-operation being defined in each of the first program and the second program, wherein the computer-readable instructions, when executed by the controller, further causes the device to perform:

developing functions contained in the first program identified by the first identifier and functions contained in the second program identified by the second identifier in the memory;

determining whether functions of the pre-operations and the main-operations defined in all the multiple jobs defined in the definition data are included in the functions developed in the memory;

starting, in the pre-process, the functions of the pre-operation, from among the functions developed in the memory, in an order represented by the order information; and starting, in the main-process, the functions of the main-operation, from among the functions developed in the memory, in an order represented by the order information.

9. The non-transitory computer-readable recording medium according to claim 8, wherein the device further comprises an input interface, and wherein the computer-readable instructions, when executed by the controller, cause the device to perform:

receiving a designating operation to designate at least one of multiple first candidate identifiers as the first identifier and a designating operation to designated at least one of multiple second candidate identifiers as the second identifier through the input interface, the first candidate identifiers identifying instructions to execute the input job and the second candidate identifiers identifying instructions to execute the output job; and storing the definition data including the first identifier and the second identifier as designated in the memory.

10. The non-transitory computer-readable recording medium according to claim 9, wherein the device further comprises a display, wherein the computer-readable instructions, when executed by the controller, cause the device to perform:

displaying a first screen a first object corresponding to the input job using a designation device and a second object corresponding to the output job using the designation device on the display, the designation device being one of multiple image forming devices which are communicatable through the communication interface and designated by the user through the input interface;

receiving designation of one of the first object and the second object through the input interface;

in response to designation of the first object, displaying a second screen including multiple output destination objects respectively corresponding to the multiple output destinations in the output job on the display;

receiving designation of one of the output destination objects through the input interface;

in response to receipt of the second object, displaying a third screen including multiple obtaining source objects respectively corresponding to obtaining sources of the image data in the input job on the display;

receiving designation of one of the obtaining source objects through the input interface; and storing one of the definition data including the first identifier corresponding to the first object and the second identifier corresponding to the output destination object as designated and the definition data including the first identifier corresponding to the designated obtaining source object and the second identifier corresponding to the second object.

11. The non-transitory computer-readable recording medium according to claim 9, wherein the computer-readable instructions, when executed by the controller, further cause the device to perform:

receiving designation of one of multiple pieces of definition data stored in the memory through the input interface; and retrieving the designated one of the multiple pieces of definition data from the memory.

12. A multi-function peripheral, comprising:

a scanner;

a printer;

a memory configured to store a work flow program and a plurality of job programs, the plurality of job programs respectively corresponding to a plurality of jobs and defining corresponding ones of the plurality of jobs, each of the plurality of job programs defining at least a pre-operation and a main-operation of the corresponding one of the plurality of jobs, the pre-operation being an operation to be executed prior to execution of the main-operation of the corresponding one of the plurality of jobs, a communication interface;

a notification interface; and a controller, the workflow program causing, when executed by the controller, the multi-function peripheral to:

obtain a workflow definition file defining the plurality of jobs to be executed and an execution order of the plurality of jobs, the plurality of jobs including an input job and an output job, the input job causing the scanner to execute a reading operation to read an image on an original and generate image data representing the read image and obtaining the image data, and an output job causing the printer to record an image represented by the image data which is obtained in the input job on a sheet;

start a pre-process in accordance with an execution order of the plurality of jobs defined in the workflow definition file, the pre-process being the pre-operations respectively defined in each of the plurality of job programs respectively corresponding to the plurality of jobs defined in the workflow definition file;

determine whether the pre-operations corresponding to all the plurality of jobs defined in the workflow definition file have been started and successfully completed;

in response to determination that the pre-operations defined in all the plurality of jobs defined in the workflow definition file have successfully completed, start a main-process in accordance with the execution order of the plurality of jobs defined in the workflow definition file, the main-process being the main-operations respectively defined in each of the plurality of job programs respectively corresponding to the plurality of jobs defined in the workflow definition file, wherein the main-operation defined in the input job is an operation to receive the image data generated in the reading operation from the scanner through the communication interface, wherein the main-operation defined in the output job is an operation to output the image data; and in response to determination that at least one of the pre-operations defined in all the plurality of jobs defined in the workflow definition file has abended, cause the notification interface to notify that the plurality of jobs defined in the workflow definition file are inexecutable.

13. The multi-function peripheral according to claim 12, the controller further causes the multi-function peripheral to execute a post-process in which multiple post-operations are executed, the post-operations being operations to release resources of the multi-function peripheral used in corresponding main-operations and defined in the plurality of jobs, respectively.

14. The multi-function peripheral according to claim 12, wherein an edit job to edit the image data input in the input job is further defined, and
wherein the output job outputs the image data having been edited in the edit job.

15. The multi-function peripheral according to claim 12, wherein the pre-process defined in the input job causing the scanner to read the image on the original and generate the image data is one of:
determining whether a communication with the scanner through the communication interface is available;
determining whether the scanner is executing another reading operation; and
determining whether the scanner is configured to execute the reading operation in accordance with an execution condition defined in the definition data.

16. The multi-function peripheral according to claim 12, wherein the pre-process defined in the output job causing the printer to record an image represented by the image data on a sheet is one of:
determining whether a communication with the printer through the communication interface is available;
determining whether the printer is executing another recording operation; and
determining whether the printer is configured to execute the recording operation in accordance with an execution condition defined in the definition data.

17. The multi-function peripheral according to claim 12, wherein the pre-operation is an operation to check whether the multi-function peripheral is in a state where the corresponding main-operation can be executed.

18. A multi-function peripheral, comprising:
a scanner;
a printer;
a communication interface;
a notification interface; and
a controller,
the controller causing the multi-function peripheral to obtain definition data in which a workflow is defined, the workflow containing multiple jobs including an input job and an output job, the input job causing the scanner to execute a reading operation to read an image on an original and generate image data representing the read image and obtaining the image data, and an output job causing the printer to record an image represented by the image data which is obtained in the input job on a sheet,
the controller causing the multi-function peripheral to execute a pre-process in which pre-operations respectively defined in the multiple jobs contained in the workflow in order, the pre-operations being operations to examine whether the multiple jobs being executable,
the controller further causing the multi-function peripheral to perform:

determining whether the pre-operations defined in all the multiple jobs contained in the workflow have successfully completed;
in response to determination that the pre-operations defined in all the multiple jobs contained in the workflow have successfully completed, causing the multi-function peripheral to execute a main-process in which main-operations respectively defined in the multiple jobs contained in the workflow in order, wherein the main-operation defined in the input job is an operation to receive the image data generated in the reading operation from the scanner through the communication interface, wherein the main-operation defined in the output job is an operation to output the image data; and
in response to determination that at least one of the pre-operations defined in all the multiple jobs has abended, causing the notification interface to notify that the multiple jobs defined in the workflow are inexecutable;
wherein the controller further causes the multi-function peripheral to perform:
determining whether both the pre-operation and the main-operation are defined in each of the multiple jobs;
in response to determination that both the pre-operation and the main-operation are defined in each of the multiple jobs, causing the multi-function peripheral to execute the pre-operations; and
in response to determination that at least one of the pre-operation and the main-operation is not defined in at least one of the multiple jobs, causing the notification interface to notify that the multiple jobs defined in the workflow are inexecutable.

19. The multi-function peripheral according to claim 18, further comprising a memory,
wherein the definition data includes a first identifier, a second identifier and order information indicating an execution order of the input job and the output job, the first identifier identifying a first program executing the input job, the second identifier identifying a second program executing the output job, functions realizing the pre-operation and the main-operation being defined in each of the first program and the second program,
wherein the controller further causes the multi-function peripheral to perform:
developing functions contained in the first program identified by the first identifier and functions contained in the second program identified by the second identifier in the memory;
determining whether functions of the pre-operations and the main-operations defined in all the multiple jobs defined in the definition data are included in the functions developed in the memory;
starting, in the pre-process, the functions of the pre-operation, from among the functions developed in the memory, in an order represented by the order information; and
starting, in the main-process, the functions of the main-operation, from among the functions developed in the memory, in an order represented by the order information.

20. The multi-function peripheral according to claim 19, further comprising an input interface, and
wherein the controller causes the multi-function peripheral to perform:
receiving a designating operation to designate at least one of multiple first candidate identifiers as the first identifier and a designating operation to designated at least one of multiple second candidate identifiers as the second identifier through the input interface, the first candidate identifiers identifying instructions to execute the input job and the second candidate identifiers identifying instructions to execute the output job; and storing the definition data including the first identifier and the second identifier as designated in the memory.

21. The multi-function peripheral according to claim 20, further comprising a display, wherein the controller further causes the multi-function peripheral to perform:

displaying a first screen a first object corresponding to the input job using a designation device and a second object corresponding to the output job using the designation device on the display, the designation device being one of multiple image forming devices which are communicatable through the communication interface and designated by the user through the input interface;

receiving designation of one of the first object and the second object through the input interface;

in response to designation of the first object, displaying a second screen including multiple output destination objects respectively corresponding to the multiple output destinations in the output job on the display;

receiving designation of one of the output destination objects through the input interface;

in response to receipt of the second object, displaying a third screen including multiple obtaining source objects respectively corresponding to obtaining sources of the image data in the input job on the display;

receiving designation of one of the obtaining source objects through the input interface; and storing one of the definition data including the first identifier corresponding to the first object and the second identifier corresponding to the output destination object as designated and the definition data including the first identifier corresponding to the designated obtaining source object and the second identifier corresponding to the second object.

22. The multi-function peripheral according to claim 20, wherein the controller further causes the multi-function peripheral to perform:

receiving designation of one of multiple pieces of definition data stored in the memory through the input interface; and retrieving the designated one of the multiple pieces of definition data from the memory.

* * * * *

UNITED STATES PATENT AND TRADEMARK OFFICE
CERTIFICATE OF CORRECTION

PATENT NO. : 9,965,235 B2
APPLICATION NO. : 15/381577
DATED : May 8, 2018
INVENTOR(S) : Susumu Fujiwara It is certified that error appears in the above-identified patent and that said Letters Patent is hereby corrected as shown below:

In the Claims

Column 28, Claim 12, Line 17 should read:
a memory configured to store a workflow program and a Signed and Sealed this
Seventh Day of August, 2018

Andrei Iancu
*Director of the United States Patent and Trademark Office*